(12) United States Patent
Campbell et al.

(10) Patent No.: US 11,946,820 B2
(45) Date of Patent: Apr. 2, 2024

(54) STRUCTURAL HEALTH MONITORING SYSTEM AND METHOD

(71) Applicant: Knowix, LLC, Houston, TX (US)

(72) Inventors: Richard V. Campbell, Havana, FL (US); Philip Bull, Llangedwyn (GB); John Wiley Horton, Tallahassee, FL (US); Luis Padilla, Katy, TX (US)

(73) Assignee: Knowix, LLC, Houston, TX (US)

( * ) Notice: Subject to any disclaimer, the term of this patent is extended or adjusted under 35 U.S.C. 154(b) by 0 days.

(21) Appl. No.: 17/684,475

(22) Filed: Mar. 2, 2022

(65) Prior Publication Data

US 2022/0373413 A1 Nov. 24, 2022

Related U.S. Application Data

(63) Continuation-in-part of application No. 17/516,823, filed on Nov. 2, 2021, now Pat. No. 11,650,120, which is a continuation-in-part of application No. 16/654,097, filed on Oct. 16, 2019, now Pat. No. 11,162,856, which is a continuation-in-part of application No. 16/255,913, filed on Jan. 24, 2019, now Pat. No. 11,162,855, which is a continuation-in-part of application No. 15/445,306, filed on Feb. 28, 2017, now Pat. No. 10,451,504.

(60) Provisional application No. 62/300,948, filed on Feb. 29, 2016.

(51) Int. Cl.
| | |
|---|---|
| G01L 5/04 | (2006.01) |
| G01L 5/101 | (2020.01) |
| B63B 21/00 | (2006.01) |
| B63B 21/50 | (2006.01) |

(52) U.S. Cl.
CPC .............. *G01L 5/042* (2013.01); *G01L 5/101* (2013.01); *B63B 2021/008* (2013.01); *B63B 2021/505* (2013.01)

(58) Field of Classification Search
CPC ... G01L 5/042; G01L 5/101; B63B 2021/008; B63B 2021/505; B63B 21/00
See application file for complete search history.

(56) References Cited

U.S. PATENT DOCUMENTS

| | | | | |
|---|---|---|---|---|
| 10,145,821 | B2* | 12/2018 | Farhadiroushan | G01S 5/18 |
| 10,370,962 | B2* | 8/2019 | Zhang | E21B 47/001 |
| 10,451,504 | B2* | 10/2019 | Campbell | G01L 5/103 |
| 10,974,791 | B2* | 4/2021 | Basu | B63B 79/30 |
| 11,162,855 | B2* | 11/2021 | Campbell | G01C 21/16 |

(Continued)

*Primary Examiner* — Freddie Kirkland, III
(74) *Attorney, Agent, or Firm* — Polsinelli PC

(57) ABSTRACT

A system and method for performing structural health monitoring on a structural element while it remains in service and experiences normal loading. The energy input to the element will be the normal and random energy inputs the element sees in service. The inventive system places an intelligent module at one or more points along the length of the structural element. The inventive system collects mass data from multiple modules on multiple elements. The system then applies machine learning or artificial intelligence techniques to detect changes in the measurements received from one or more modules. This approach reduces or eliminates the need to provide calibrated input energy. The invention preferably provides the ability to determine the condition of one element or sub-element under measurement relative to other elements.

8 Claims, 24 Drawing Sheets

(56) References Cited

U.S. PATENT DOCUMENTS

| | | | |
|---|---|---|---|
| 11,162,856 B2 * | 11/2021 | Campbell | G01L 5/103 |
| 2014/0022530 A1 * | 1/2014 | Farhadiroushan | G01S 5/26 |
| | | | 356/35.5 |
| 2014/0025319 A1 * | 1/2014 | Farhadiroushan | E21B 47/007 |
| | | | 702/56 |
| 2020/0173875 A1 * | 6/2020 | Campbell | G01L 5/101 |

* cited by examiner

STRUCTURAL HEALTH MONITORING SYSTEM AND METHOD

CROSS-REFERENCES TO RELATED APPLICATIONS

This non-provisional patent application is a continuation-in-part of U.S. patent application Ser. No. 17/516,823.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of structures. More specifically, the invention comprises a system and method for monitoring the health of structural elements such as tension members.

2. Description of the Related Art

In this disclosure the over-arching term "tensile strength member" encompasses any assembly of multiple fibers or elements that is intended to carry a load primarily in tension. The term includes ropes, cables, wound slings, bridge tendons, fixed rigging, etc. The terms "rope" and "cable" are used interchangeably in this disclosure. Both are examples of a "tensile fiber strength member." Both are components that readily transmit tensile forces but not compressive forces. Tensile fiber strength members must generally be connected to other components in order to be useful. A flexible cable provides a good example. Most cables include some type of end-fitting configured to transmit a load. For example, a cable used in a hoist generally includes a lifting hook on its free end. This lifting hook may be rigged to a load. The assembly of an end-fitting and the portion of the cable to which it is attached is commonly called a "termination."

The present invention has application to many fields where tensile fiber strength members are used. A non-exhaustive listing of applicable fields includes offshore lifting, ship mooring, drag line cranes (in both fixed and moveable rigging), power shovels (in both fixed and moveable rigging), civil structure tendons (suspension bridges and the like), and floating structure moorings (such as offshore oil platforms).

Tensile strength members are commonly used in critical applications, where a breakage can cause structural damage or personal injury. It is preferable in such applications to provide a system for monitoring the health of the tensile strength member. This is commonly known as structural health monitoring ("SHM"). Where traditional wire ropes are employed, structural health monitoring can be as simple as counting the number of broken strands or periodically measuring an overall length to detect any significant plastic deformation of the constituent wires.

SHM can be more difficult where high-strength synthetic filaments are used. Filaments used in modern tensile fiber strength members include DYNEEMA (ultra-high-molecular weight polyethylene), SPECTRA (ultra-high-molecular weight polyethylene), TECHNORA (processed terephhthaloyl chloride), TWARON (para-aramid), KEVLAR (para-aramid), VECTRAN (liquid crystal polymer), PBO (poly-benzobisoxazole), carbon fiber, and glass fiber (among many others). Modern cables may also be made of older, lower-strength synthetic materials such as NYLON. In the case of high-strength synthetics, the individual filaments have a thickness that is less than that of human hair. A high-capacity tensile member will include millions of individual filaments in its cross section.

One approach to SHM for a synthetic filament cable is to embed optical fibers in the cable's construction. Light is transmitted through these fibers and a baseline is established when the cable is new and undamaged. A reduction in transmissibility indicates a compromise in the cable's condition.

Many other technologies have been developed to monitor the structural health of tensile strength members. These technologies generally rely on some method of exciting the element under test and measuring a resulting output. The measurements are often taken as point readings measuring the cross section of the strength member at multiple points along its length. Depending on the length of the element, it is also sometimes possible to measure the structure longitudinally.

The challenge with most of these prior art SHM approaches is to ensure that the energy imparted to the structure is calibrated and that the method of measuring the energy returned from the structure is also calibrated. Methods for imparting the energy include simple mechanical actuation, magnetic resonance, acoustic energy, X-ray energy, etc. Multiple variables impact the accuracy of these systems including: (1) Variations in the location of the transmitting transducers and the receiving transducers, (2) Surface contamination on the structure being evaluated, (3) The presence of an actual load on the structure being evaluated, and (4) Environmental variations such as temperature.

At best it is difficult to measure the structural health of any element with certainty—even in well controlled conditions. When the element to be measured is in operational use the measurement of structural health becomes much more difficult. This is the case for many large structures. It is often impractical to remove a tensile strength member from a large structure in order to evaluate it.

A better approach to SHM would employ a wide variety of external forces that cause vibrations on the cable when it is in use. These forces are not added for the purpose of SHM, but are instead natural inputs of energy to the rope/cable. In this way, SHM can be performed while the tensile strength member remains in position and performs its intended function. The present invention provides such a system and method.

The present invention has application to many diverse fields. It is of course impractical to attempt to describe them all. However, in order to further the reader's understanding, certain exemplary applications will be described and illustrated. These are shown in FIGS. 1-6. Many other applications will occur to those skilled in the art upon reviewing this disclosure. Accordingly, the scope of the invention should be determined with reference to the claims rather than the examples provided.

FIGS. 1-3 provide a first example of a critical tensile strength member. FIG. 1 shows oil production platform 546. The platform shown is of the semi-submersible type. Buoyancy is provided by two submerged pontoons 548. Columns 550 extend upward from these pontoons to support production decks 552. Water level 554 is set by varying the amount of ballast water carried within compartments in the pontoons. When moored and operating, water level 554 is approximately as shown in the figure.

Platform 546 is free floating. In order to maintain a stabilized position and orientation, it must be moored to the sea floor. In this example, twelve mooring lines 556 are used—three for each of the four corner columns 550. FIG. 2A provides a simplified plan view of the mooring system. The distal end of each mooring line 556 is attached to an anchor 560 embedded in the sea floor. The anchors are placed to provide a stabilizing configuration which urges the oil production platform toward a central position.

FIG. 2B provides a simplified elevation view of the mooring system. Each mooring line 556 extends downward and outward to a corresponding anchor 560 embedded in the sea floor 558. The actual distance to the sea floor may be considerably greater than is depicted in FIG. 2B.

The oil production platform includes tensioning systems for adjusting and stabilizing the tension on each mooring line 556. These are used to urge oil production platform 546 deeper into the water than its free-floating state. This state ensures that tension is maintained on the mooring lines even in heavy seas.

Though considerable tension is placed on each mooring line, the reader will observe that the lines are not straight. Instead, they curve outward. This is the result of the weight of the line itself. The curvature in the mooring line itself provides an additional stabilizing effect for platform heave and roll motion. These phenomena can be exploited by the present invention—as will be explained subsequently.

Many different structures and materials can be used for the mooring lines themselves. FIG. 3 illustrates one type of exemplary structure. The particular mooring line 556 uses 12 parallel sub-ropes 564. Each of these sub-ropes is made of concentric helical windings of smaller components (The helices wrap in opposing directions to minimize the tendency of a sub-rope to rotate under load). Even a sub-rope can contain over a million individual high-strength filaments. The cross-section shown uses 9 sub-ropes arranged around 3 "core" sub-ropes.

In order to maintain the desired organization of the cable—and to provide suitable abrasion and impact protection—an encompassing braided jacket 562 is provided. The braided jacket does not carry any significant tensile load and can be made of a cheaper material—such as NYLON. In some embodiments a "filter layer" is provided between the interior of the braided jacket and the sub-ropes. This filter layer allows water to permeate the interior of the mooring line but excludes particulates. Particulates are undesirable because they can cause internal abrasion damage.

Many other cable types are used for mooring lines and other lines to which the present invention can be applied. The invention is by no means limited to the example of FIG. 3. In addition, the invention is by no means limited to underwater tensile strength members.

FIG. 4 provides an example of a land-based application. Dragline crane 8 is a massive structure. Cab 12 swivels on its mobile base. Boom 14 extends outward approximately 100 meters. Mast 16 provides a vertical offset for the fixed tensile strength members and for a drum that directs the lift rope used to raise and lower bucket 18.

During digging operations, mast 16 and boom 14 are not raised and lowered—though they do of course swing with the crane as a whole. Two or more bridge support ropes 36 extend from A-frame 34 to the top of mast 16. Two or more additional bridge support ropes 36 extend from the top of mast 16 to the distal end of boom 14. These support ropes 36 carry the weight of the boom and maintain its working position. Such support ropes are a good application for structural health monitoring. The present invention can provide such monitoring while the crane is in operation.

FIG. 5 shows an example of a large marine vessel 240 moored alongside a quay 252. Numerous mooring lines 244 extend form the vessel to bollards 242 along the side of the key. Winches onboard the vessel apply tension to the mooring lines in order to draw the vessel laterally against one or more mooring stays 250. The winches then maintain the desired position of the vessel while cranes unload the cargo. The present invention can be used for structural health monitoring of mooring lines 244.

FIG. 6 shows still another exemplary application. Tug 565 is towing vessel 240. Tow line 568 carries a large and variable tensile load. Winch 566 onboard the tug is used to regulate the tensile load. The present invention can be used for structural health monitoring of tow lines 568.

Many other applications will benefit from the ability of the present invention to perform structural health monitoring while a tensile strength member remains in active service. Any system that has tensile strength member elements (such as steel wire or/and fiber rope, chains, connecting devices, anchors devices etc.) used to hold or stabilize the position of any device can be monitored by measuring the input and output energy of each element or sub element used to hold the device in position.

BRIEF SUMMARY OF THE PRESENT INVENTION

The present invention comprises a system and method for performing structural health monitoring on a structural element while it remains in service and experiences normal loading. The energy input to the element will be the normal and random energy inputs the element sees in service. The inventive system places an intelligent module at one or more points along the length of the structural element. The inventive system collects mass data from multiple modules on multiple elements. The system then applies machine learning or artificial intelligence techniques to detect changes in the measurements received from one or more modules. This approach reduces or eliminates the need to provide calibrated input energy. The invention preferably provides the ability to determine the condition of one element or sub-element under measurement relative to other elements.

Figure 1:
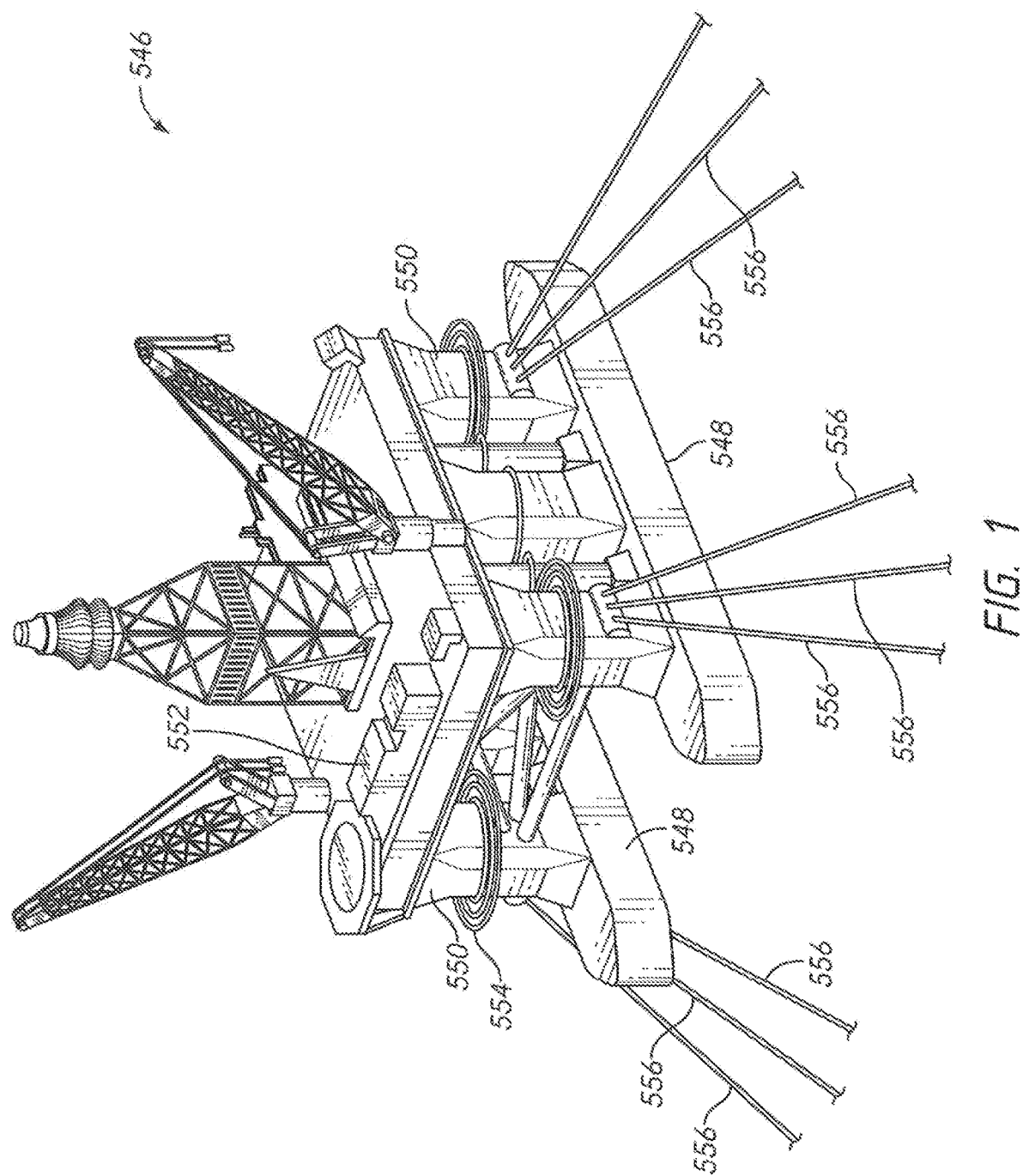
FIG. 1 is a perspective view, showing a prior art oil production platform.

REFERENCE NUMERALS IN THE DRAWINGS 8 dragline crane
10 cable
12 cab
14 boom
16 mast
18 bucket
34 A-frame
36 bridge support rope
202 intelligent cable module
240 vessel
242 bollard
244 mooring line
250 mooring stay
376 transverse tube
378 orientation cap
379 receiver
385 collar
386 hollow passage
388 instrumentation package
390 antenna
394 hole
404 strain gauge
458 processor
460 strain gauge controller
546 oil production platform
548 pontoon
550 column
552 production decks
554 water level
556 mooring line
558 sea floor
560 anchor
562 braided jacket
564 sub-rope
565 tug
566 winch
568 tow line
569 anchor point
570 anchor point
572 heave translation
574 static position
576 dynamic position
578 lateral translation
580 tension curve
582 hatch
583 accelerometer module
584 sonic communication module
586 R/F communication module
588 transducer
589 transducer
590 origin
592 first emitter
594 second emitter
596 first emitter arc
597 third emitter
598 second emitter arc
599 fourth emitter
600 fifth emitter
602 sixth emitter
604 propagation delay
606 propagation delay
608 propagation delay
610 first resonance mode
612 second resonance mode
614 shock load
616 damping profile
618 shock load
620 damping profile
622 data collector
624 data collector
626 data collection and analysis system
628 superior segment
630 inferior segment
632 inferred local segment
634 processor
636 memory
638 display module
640 communication module
642 data collection module
644 data collection module

DETAILED DESCRIPTION OF THE INVENTION

Figure 7:
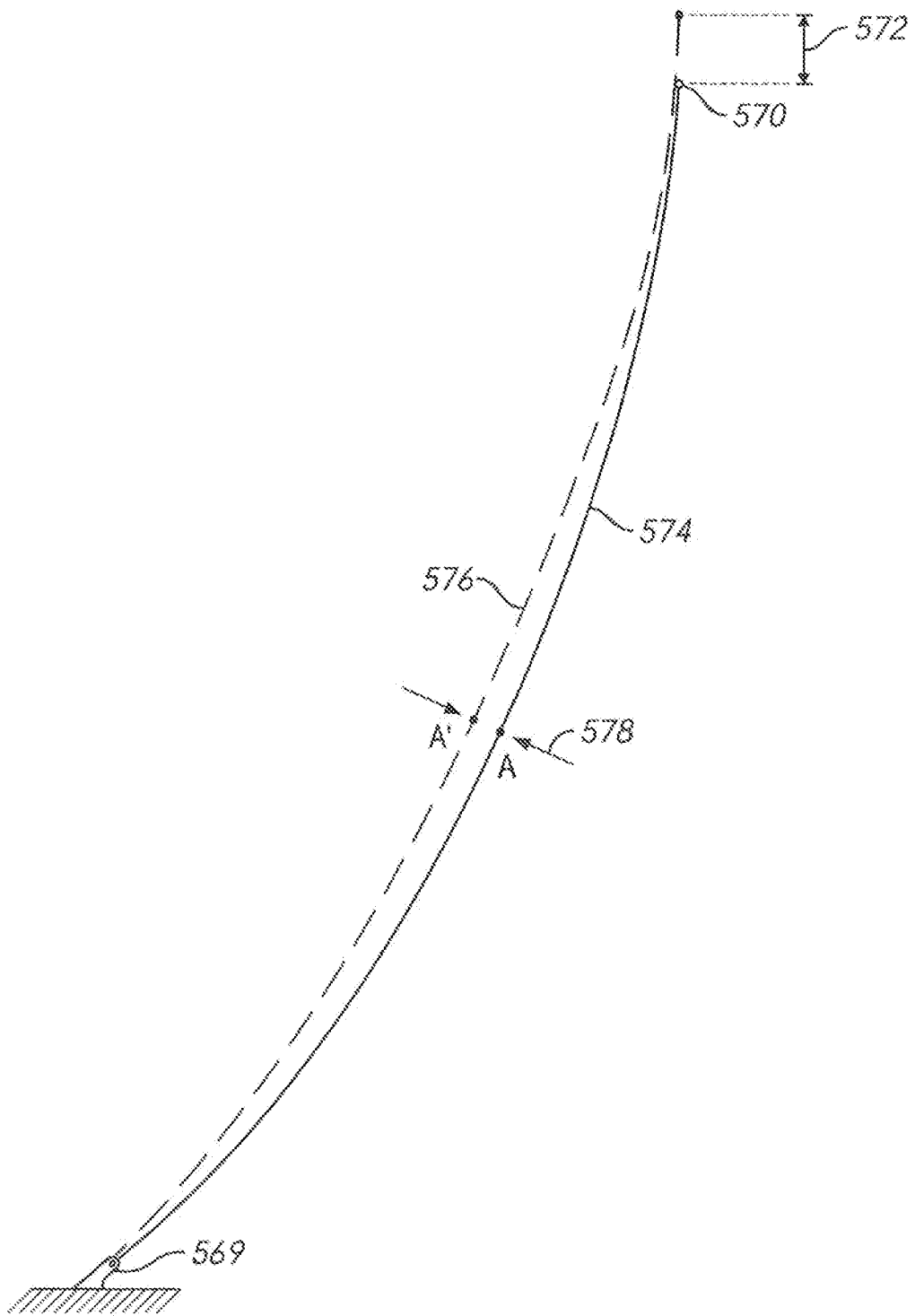
FIG. 7 is an elevation view, showing the complex motion of an oil platform mooring line.
Figure 8:
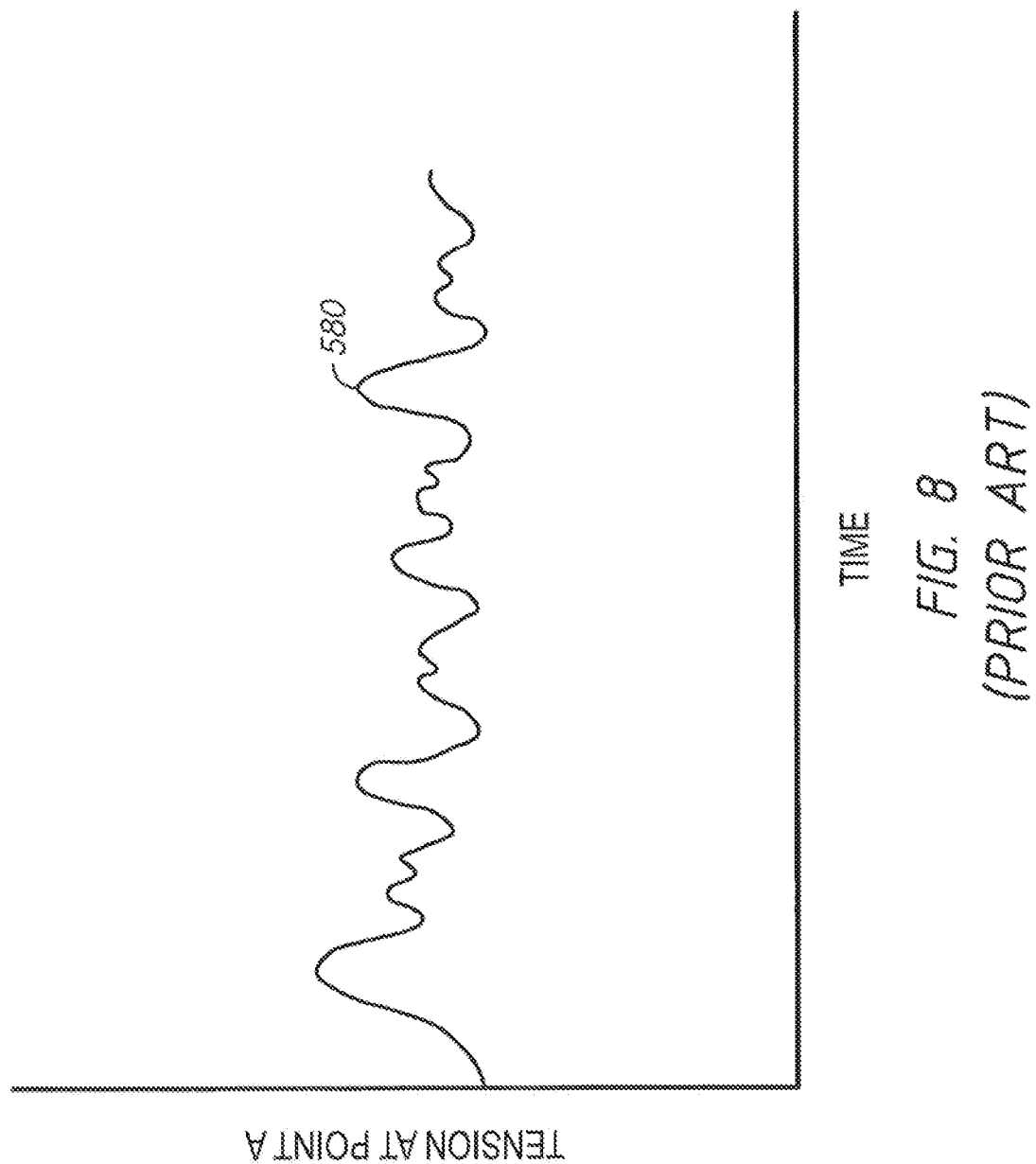
FIG. 8 is a plot showing mooring line tension versus time.

FIGS. 7 and 8 illustrate some useful information that can be obtained from a mooring line and used for structural health monitoring. FIG. 7 shows an elevation view of a mooring line connected between anchor point 569 and anchor point 570. In this example, anchor point 569 is attached to an anchor on the sea floor and anchor point 570 is attached to a semi-submersible oil production platform. The mooring line shown is part of a larger assembly of mooring lines configured to stabilize the position and attitude of the oil platform. As explained previously, substantial tension is placed on the mooring line so that it remains in tension at all times—even in rough seas.

When the sea and wind are both perfectly calm, the oil production platform will reach a stable position in the middle of the mooring line array. In such a state all rolling motion of the platform will also cease. The particular mooring line shown will assume static position 574. The curve shown in static position 574 is the result of the weight of the cable itself. The point A represents a selected point along the length of the mooring line.

Of course, the sea and wind surrounding the platform will rarely be calm. Passing waves will tend to induce vertical motion in the platform—referred to as "heave." In FIG. 7 a passing wave has created heave translation 572 in anchor point 570. The mooring line will then move to dynamic position 576—shown as a dashed line. Point A is laterally translated to occupy point A' because the curvature of the line is at least in part a function of the tension applied. Lateral translation 578 has occurred at point A/A'. The measurement of this lateral translation can be useful to the present inventive system.

It would also be useful to know a present value for the tension at point A/A'. FIG. 8 presents a plot of instantaneous tension at point A/A' versus time—tension curve 580. As those skilled in the art will know—the motion of the mooring line is not nearly as simple as depicted in FIG. 7. Such a mooring line may be 3 km long. The lateral motion will tend to travel in waves down the cable. Of course, the cable will tend to stretch longitudinally under the applied tension. Longitudinal waves will also tend to travel down the cable.

In order to gain a meaningful picture of the tension and motion in the cable, it is advantageous to take measurements at multiple points along the cable. The present invention employs multiple intelligent cable modules placed along the length of the mooring line to collect data. Exemplary embodiments of these modules are described in detail in the parent application (U.S. patent application Ser. No. 17/516, 823), which is hereby incorporated by reference. FIGS. 9-12 depict an embodiment well suited to the present invention.

Figure 9:
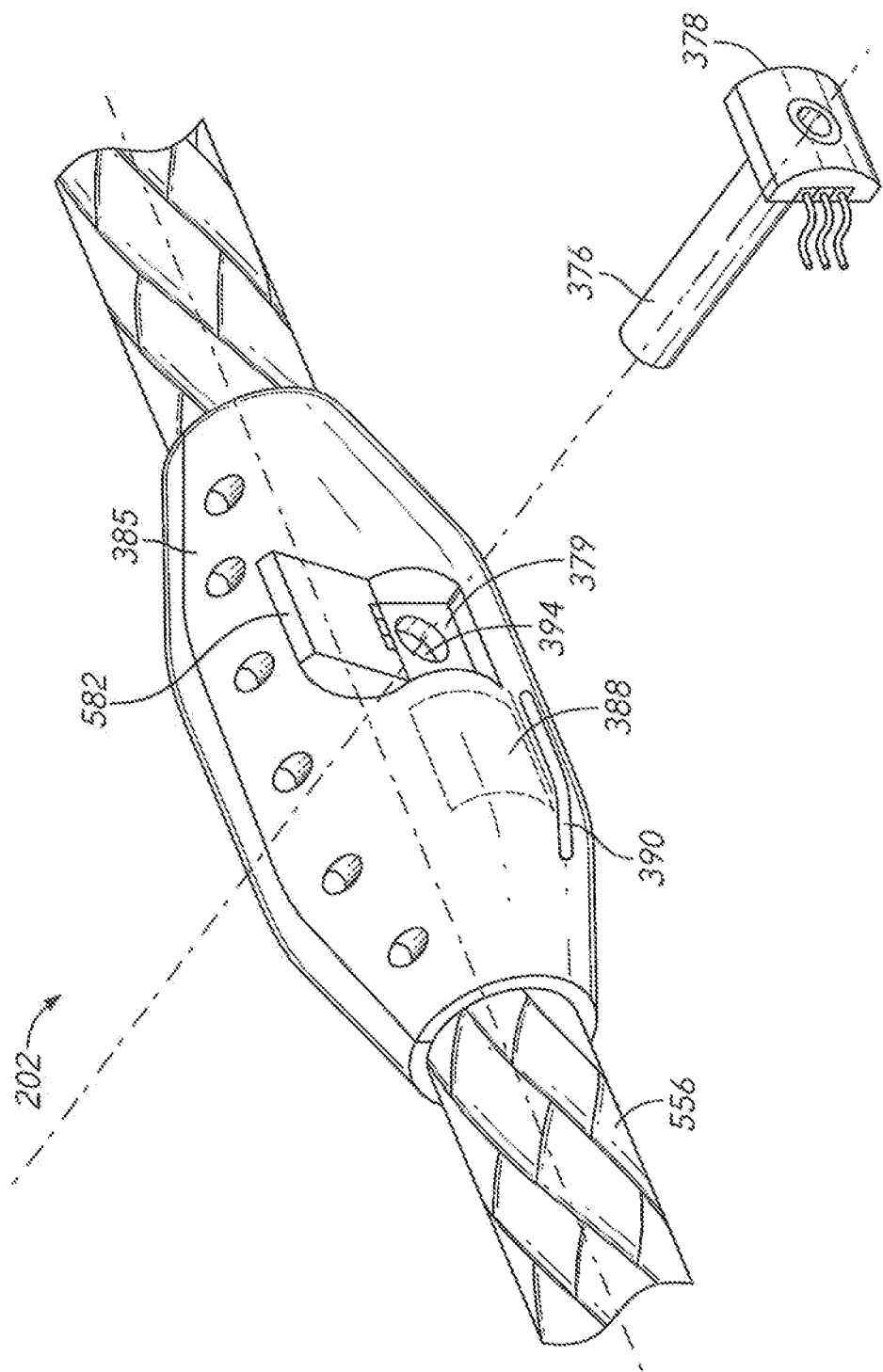
FIG. 9 is an exploded perspective view, showing an exemplary intelligent cable module as used in the inventive system.

FIG. 9 depicts the mooring line 552 with an attached intelligent cable module 202. The concept in this example is to insert a transverse measurement element laterally through the cable strands. In the example shown a hollow transverse tube 376 is used as the transverse measurement element. The hollow tube is instrumented—such as by the inclusion of an array of strain gauges on the inside or outside. When tension is applied to the cable, the strands squeeze the tube and the resulting change monitored by the instrumentation (such as an altered voltage drop across a strain gauge) can be correlated to the applied tension.

It is desirable to retain the transverse measurement element in a stable orientation to hold calibration and the assembly shown in FIG. 9 does this. Collar 385 is applied to the cable's exterior. A solid collar 385 can be added by sliding it over one end of the cable. If the intelligent cable module is to be added after terminations have been added to both of the cable's ends—a common situation—a split collar is desirable. FIG. 9 shows an example with a split collar 385 (Note the parting seam for the two halves of the collar). The collar includes a hollow passage for the cable. Hole 394 passes transversely through collar 385.

Transverse tube 376 in this example includes a hollow passage in its interior. The portion of this passage that is most distant from the viewer in FIG. 9 includes a female thread. An optional tapered piercer can thread into the female thread in transverse tube 376. The piercer makes it easier to pass the transverse tube laterally through the cable. With collar 385 in place, the transverse tube and its attached piercer are carefully pushed transversely through the cable strands and out the far side of collar 384. As those skilled in the art will realize, the presence of piercer 382 greatly assists this process if the cable strands are tight. If the cable strands are able to be opened this may not be a necessary component.

Once the transverse tube is in place, the piercer is removed and the far end of the tube is secured to the far side of collar 385. In the example shown, the near side of the transverse tube is secured to orientation cap 378. The orientation cap is secured into receiver 379. Instrumentation package 388 is also contained within the module 202. Suitable electrical connections are made between transverse tube 376 and instrumentation package 388 (such as connecting the stain gage array within transverse tube 376 to monitoring circuitry within the instrumentation package). Hatch 582 is then closed over orientation cap 378 and secured. The transverse tube is thus held securely on both ends—with its middle resting within the cable.

Collar 385 is preferably made of a tough and durable material that serves to protect the components it houses against the surrounding environment. The collar provides a smooth exterior that will not tend to snag on other objects. Antenna 390 is provided proximate the surface of the collar. The antenna—which might more generally be referred to as a transducer—is preferably able to send and receive communications with outside devices. It may be an R/F antenna or a purely acoustic transducer.

Figure 10:
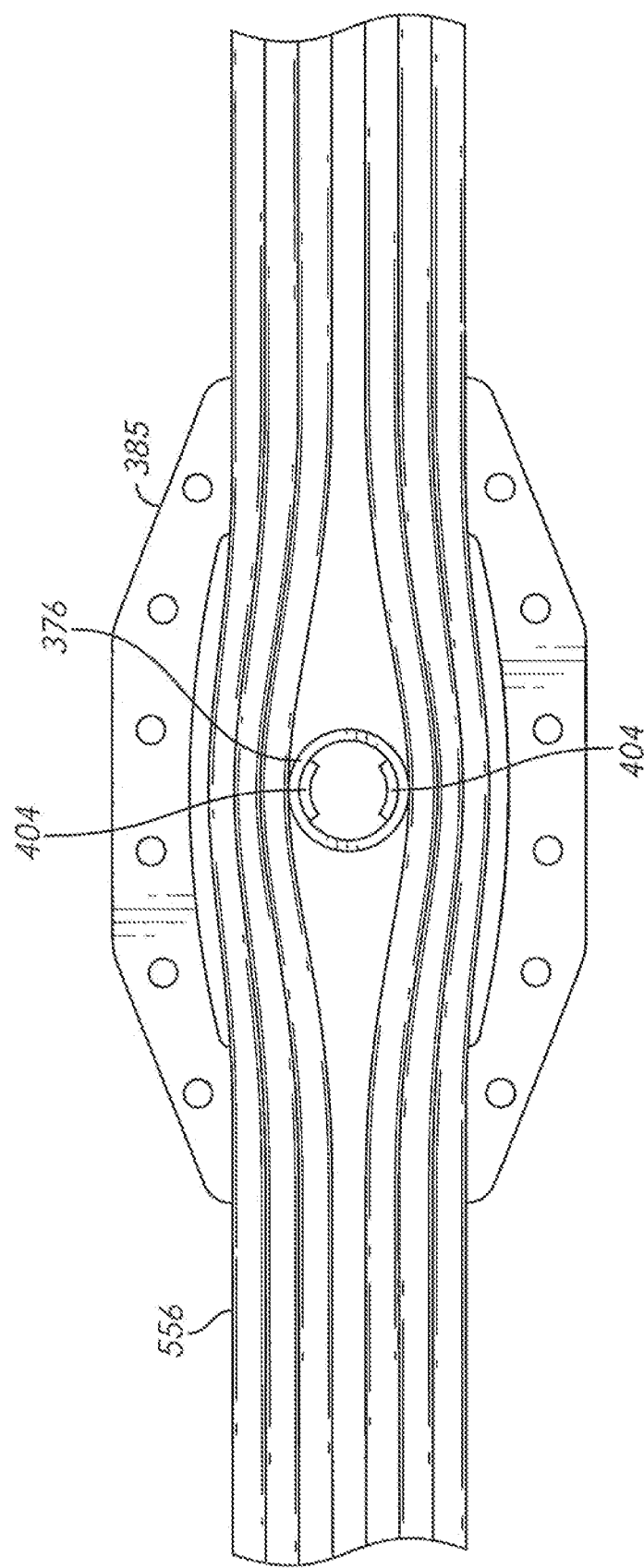
FIG. 10 is an elevation view, showing the module of FIG. 9.

FIG. 10 shows a simplified sectional view through the middle of the assembly of FIG. 9. The cable's strands pass around transverse tube 376 (which is of course secured to collar 385). One or more strain gauges 404 are provided at suitable locations on the transverse tube. In the example shown, the strain gauges are located on the interior wall of the transverse tube.

Electrical connections are made between strain gauges 404 and instrumentation package 388 located in collar 385. The instrumentation package monitors the strain measured by the strain gauges. It can communicate with external devices using antenna 390.

Although the transverse measurement element has been illustrated as having a circular cross section, many other shapes can be used. An oval or filleted diamond shape may be selected since it will tend to cause less disruption to the lay of the cable's strands. The transverse measurement element may also be solid rather than hollow. In still other examples the measurement element will have varying geometry down the axis. It may be oval in the center for example, yet round or square at the two distal ends. Alternatively, it may be entirely ovular. It may be one or many pieces.

This exemplary intelligent cable module contains a tension proxy measurement device. The term "tension proxy measurement" means a measurement that can be made of a value that is related to the tension applied to the cable. For the example of FIGS. 9 and 10, the tension proxy measurement is the measurement of the voltage drop across the strain gauges placed in the transverse hollow tube. The value for the voltage drop can be correlated to the tension applied on the cable and—once a good correlation is established—the values obtained for the voltage drop across the strain gauges can easily be converted into values for applied tension.

The relationship between the value measured by a strain gauge—or some other tension proxy measurement in an intelligent cable module—and the tension applied to the cable is quite complex. Thus, it is difficult to develop a mathematical expression that relates the tension proxy measurement to applied tension. This is not to say that it is impossible to develop such a relationship. However, variations from cable to cable make the uncertainty in using such a defined relationship so large that it is not practical. A more practical solution is to calibrate cable tension versus a measured value for a particular cable design, and more preferably even for a particular cable.

A calibration process can be applied to produce a calibration curve relating the intelligent cable module's internal measurements (such as the tension proxy measurements) to the derived value (such as cable tension). In this disclosure the term "calibration curve" is to be understood broadly to mean any method of storing a relationship between internal measurements made by an intelligent cable module and a derived value. The "calibration curve" can assume the form of a mathematical function, a look-up table, a look-up table with interpolation, or any other suitable form.

An example will be described using the intelligent cable module 202 of FIG. 9. Once this module is installed on the cable, tension applied to the cable will squeeze transverse tube 376. The strain gauges attached to transverse tube 376 respond to this squeezing force. Thus, the internal measurement made by the intelligent cable module is a voltage drop across a strain gauge array (the tension proxy measurement). An external device is used to measure the applied tension (typically a calibrated load cell).

Prior to calibration the cable assembly is typically "bedded" by applying a series of tensile loads to seat all the components. After bedding, a calibration load cell is attached in series. This calibration load cell will provide the actual tension applied to the cable. Readings taken from the tension proxy measurement on the intelligent cable module are then correlated against the actual applied tension to create a calibration curve. Once the calibration curve is established, the measurements taken by the intelligent cable module can be easily converted to actual tension.

Of course, in the present invention, it may not be necessary to determine actual tension. One approach in structural health monitoring is simply to establish a known-good baseline and then monitor for a significant deviation from that baseline. In the case of an offshore oil production platform, the invention could be applied by correlating the measurements made by the intelligent cable module to sea state. As an example, a data collection and analysis system can store strain gage readings from the intelligent cable module correlated to the maximum wave height currently being observed by the platform. The system would then build a baseline picture of expected strain gauge readings for a given wave height.

This would allow the system to know what strain gage reading should be observed for a given sea state. A significant variation from these anticipated readings would then indicate a reduction in structural health.

Figure 11:
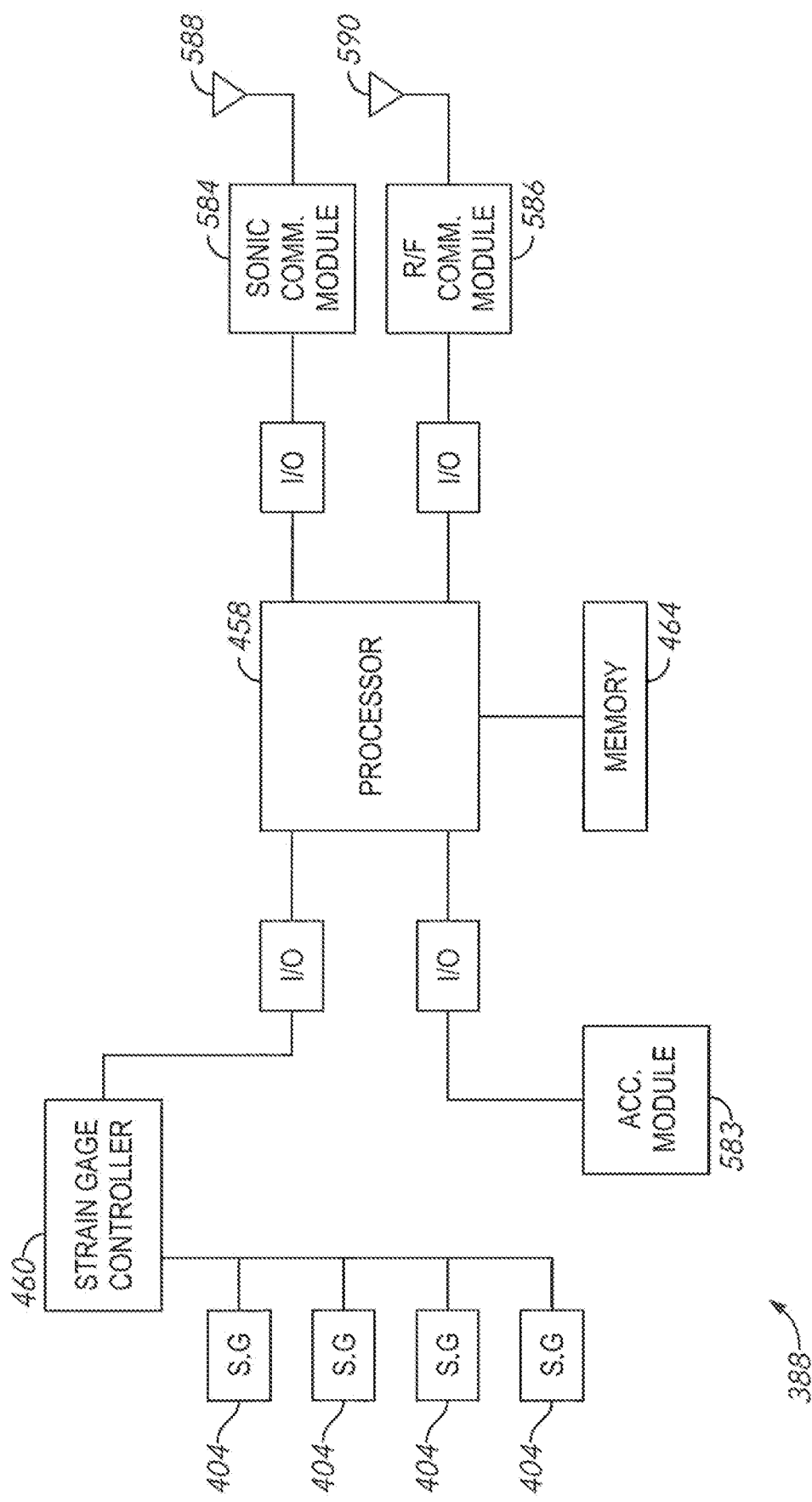
FIG. 11 is a block diagram showing exemplary internal components of the module of FIG. 9.

The processing and communication aspects of an intelligent cable module can be realized in an endless variety of embodiments. FIG. 11 depicts one exemplary embodiment. Instrumentation package 388 contains a processor 458 and associated memory 464. The memory stores software which can be loaded and executed by the processor. The processor has numerous Input/Output ("I/O") ports that allow it to communicate with other components. As an example, one I/O port is dedicated to communication with strain gage controller 460. The strain gage controller provides regulated voltages to each of the strain gages 404 it monitors. The controller includes sensitive detection circuits that are able to regularly and accurately detect a change in the state of the strain gauges. In this example, the data gathered by strain gauge controller 460 is converted to a digital format and sent to processor 458.

The particular intelligent cable module shown in FIG. 11 is also configured to measure acceleration. Accelerometer module 583 is provided for this purpose. This module also communicates with processor 458 through a dedicated I/O port. The accelerometer module can be a simple device—such as single axis accelerometer configured to detect the lateral acceleration of the module (lateral meaning in a direction that is transverse to the cable's long axis at the point where the module is attached). The accelerometer module can also be a much more sophisticated attitude and reference heading system (AHRS) configured to monitor six degrees of freedom (three orthogonal translation axes plus roll, pitch, and yaw).

Those skilled in the art will know that the absolute orientation of an AHRS system can drift over time—necessitating recalibration that may be impractical in underwater applications. However, the acceleration readings of the AHRS (both linear and angular) tend to be very accurate over time. The present invention is typically more concerned with the acceleration readings rather than a determination of precise orientation. Position can be determined by other means (as will be described subsequently). Orientation can also be accurately inferred—at least in relevant part—from the position of other modules along the cable (as will also be described subsequently).

Still considering the exemplary instrumentation package of FIG. 11, the reader will recall that the intelligent cable module preferably communicates with an external data collection and analysis system. A variety of communications methods can be provided, though these may require separate transducers. In the example of FIG. 11, processor 458 communicated with R/F communication module 586 (a radio frequency transceiver). An R/F antenna 590 is provided to send and receive radio communications.

Of course, radio frequency communications underwater are limited to very long wavelengths and are often impractical. Sonic communication module 584 is provided for underwater communications. This sends and receives signals via acoustic transducer 588. The sonic communication methodology works well underwater. It can also be used for short-range communication in air—typically using ultrasonic frequencies.

Many other components that have not been illustrated will typically be present within instrumentation package 388. One example is a power storage and distribution system. Power will typically be provided by an on-board battery. A motion-induction charging system can be provided to add energy to the battery. Such a system is particularly effective for undersea mooring operations where wave action often produces lateral motion in the mooring lines.

Figure 12:
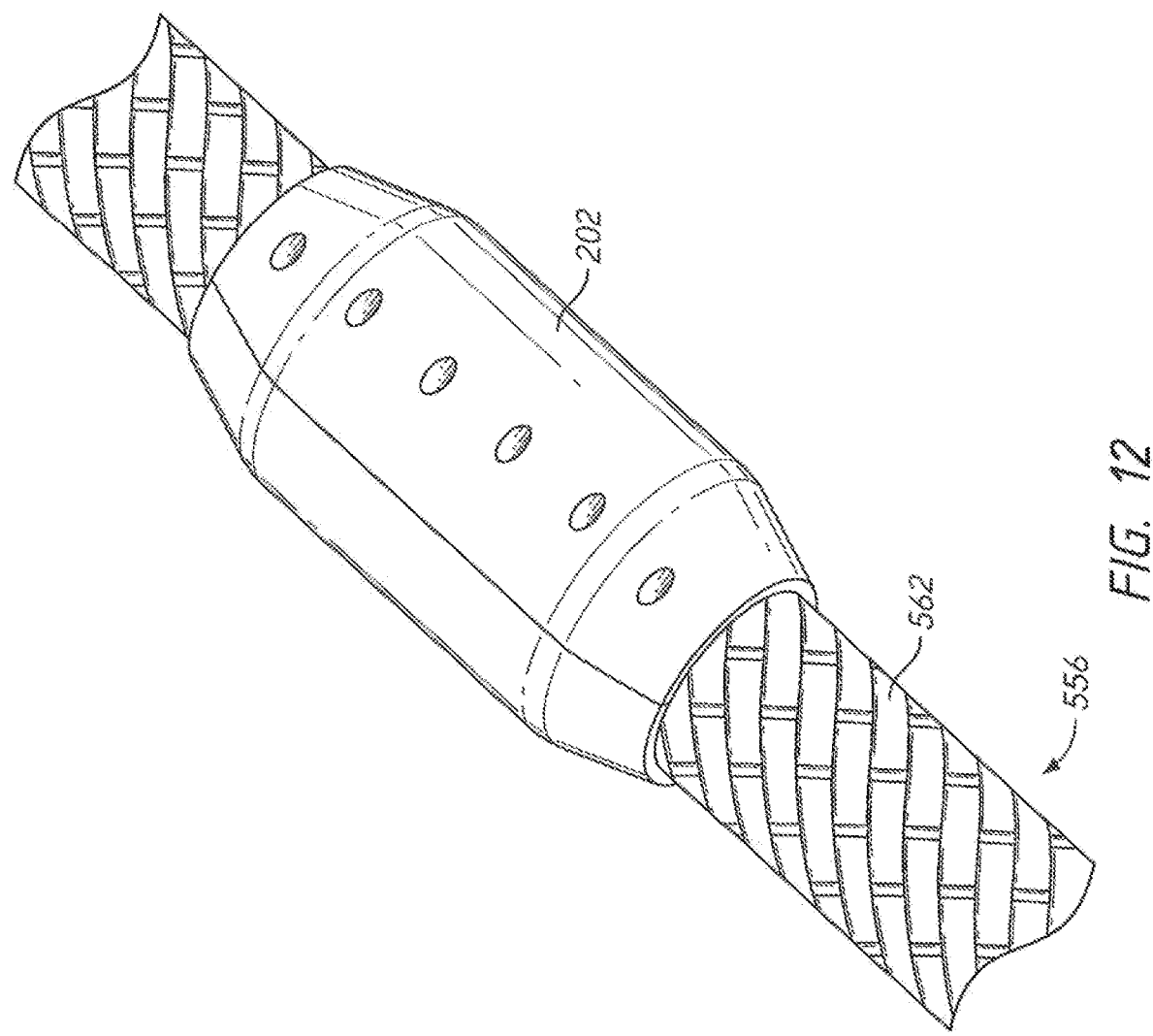
FIG. 12 is a perspective view, showing an intelligent cable module added at a point along a mooring line.

FIG. 12 shows a perspective view of an intelligent cable module 202 installed on a mooring line 556. The reader will note that the module is installed at an intermediate position along the mooring line. It does not significantly increase the bulk of the line.

Figure 13:
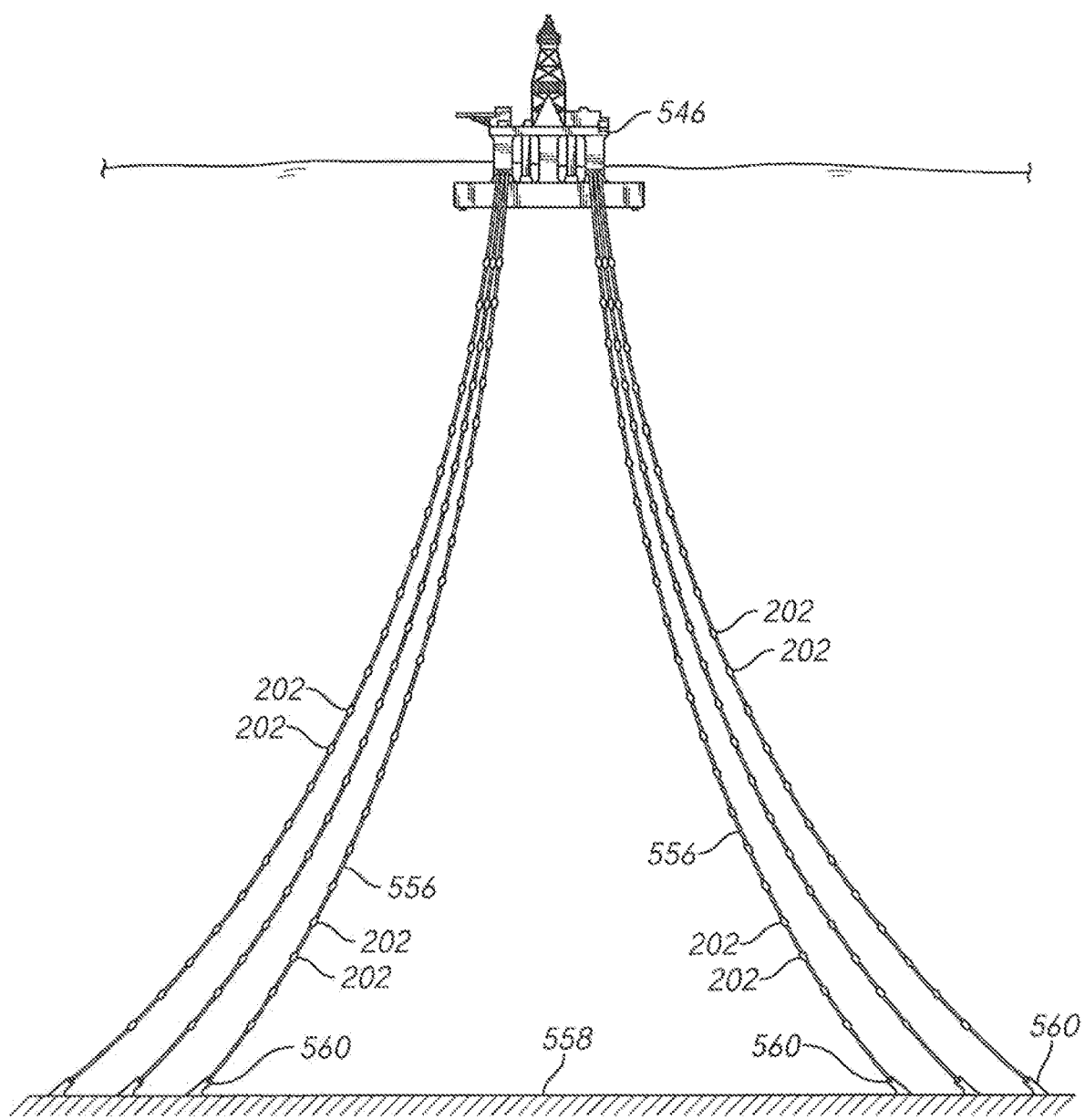
FIG. 13 is an elevation view, showing the addition of multiple intelligent cable modules to the mooring lines of an oil production platform.

Of course, such a data collection and analysis system is generally more effective when it is collecting data from multiple intelligent cable modules. An intelligent cable module can be placed in a virtually endless variety of locations, including an intermediate point along a cable, within a termination on an end of a cable, or within the cable but near a termination. FIG. 13 provides an exemplary application that serves well to illustrate the principles of operation.

Figure 2A:
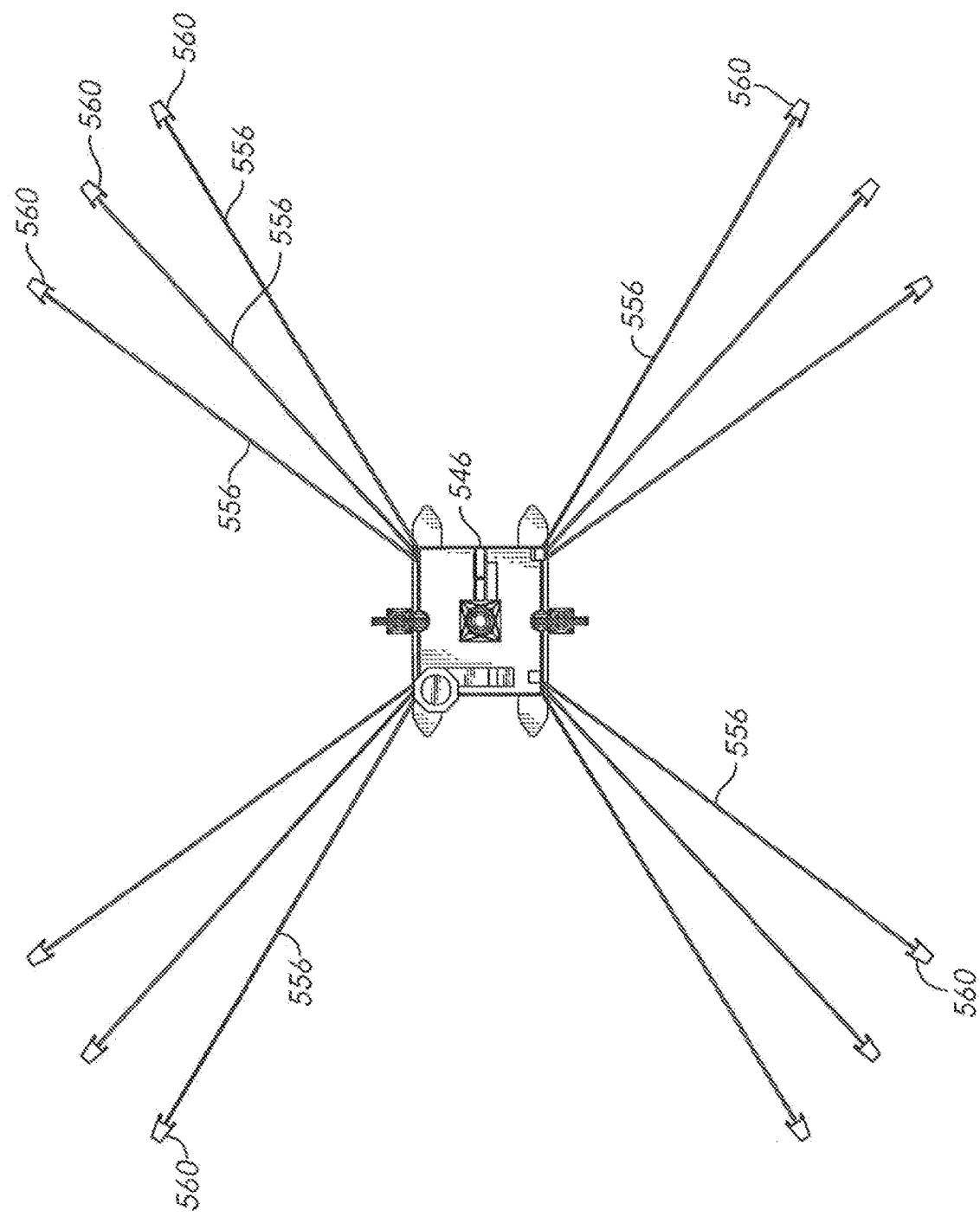
FIG. 2A is a plan view, showing a mooring system for the platform of FIG. 1.
Figure 2B:
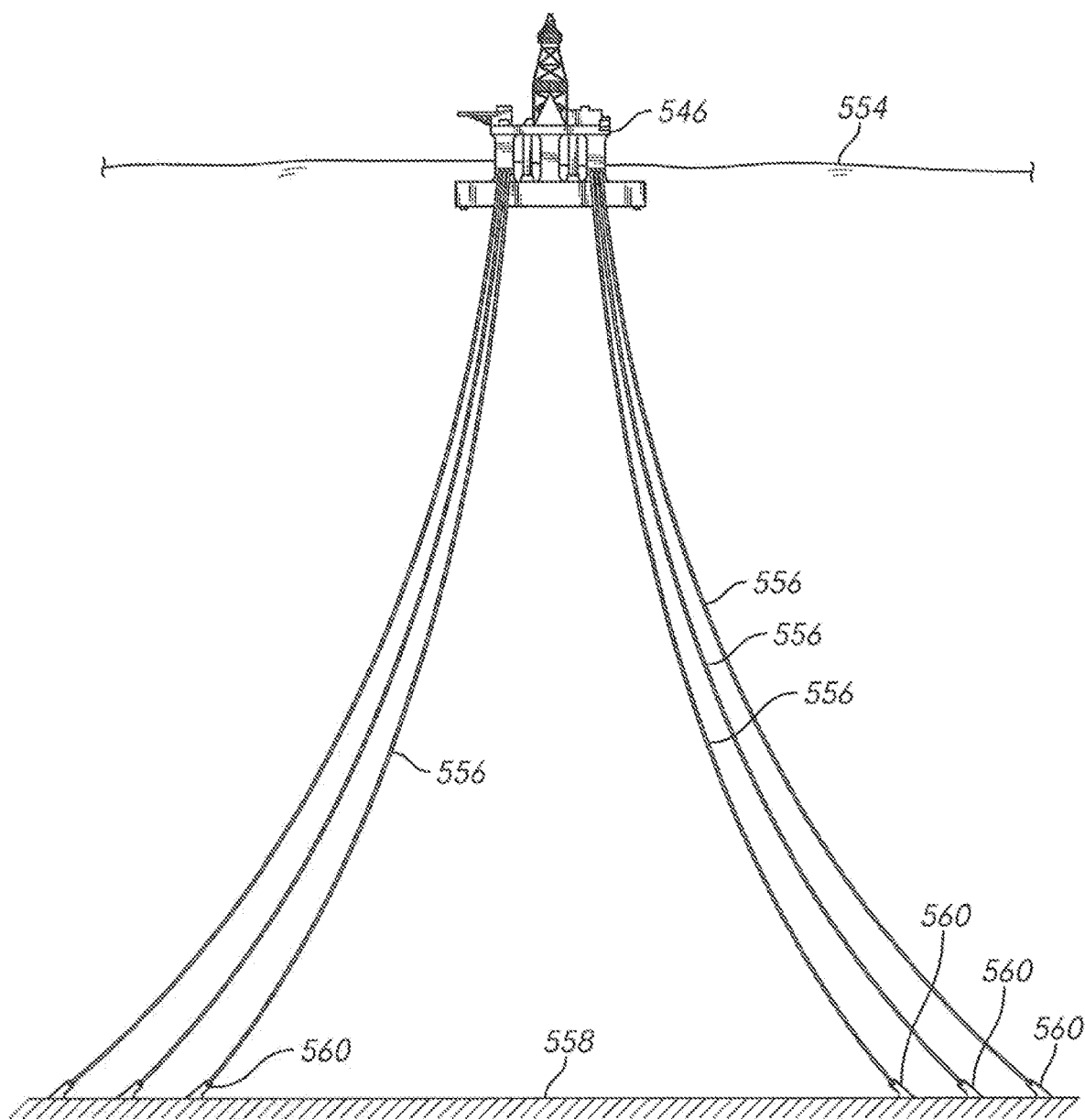
FIG. 2B is an elevation view, showing a mooring system for the platform of FIG. 1.
Figure 3:
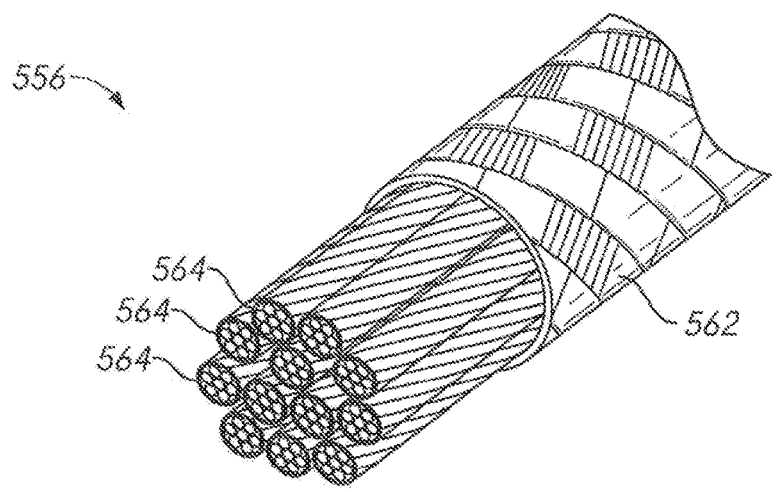
FIG. 3 is a perspective view showing an exemplary construction for a mooring line.

FIG. 13 shows a semi-submersible oil production platform 546 moored to the sea floor 558 by an array of mooring lines 556—the same arrangement as shown in FIGS. 2A and 2B. However, a set of intelligent cable modules 202 have been added to the mooring lines. These modules can be added as desired in any suitable configuration, including:
(1) at fixed intervals along the entire length of the cable,
(2) at higher concentrations in areas of particular interest—such as near the surface and near the sea floor; and
(3) in clusters at particular stations along the cable.

These modules are configured to collect desired data and transmit the data back to a data collection and analysis system.

Figure 14:
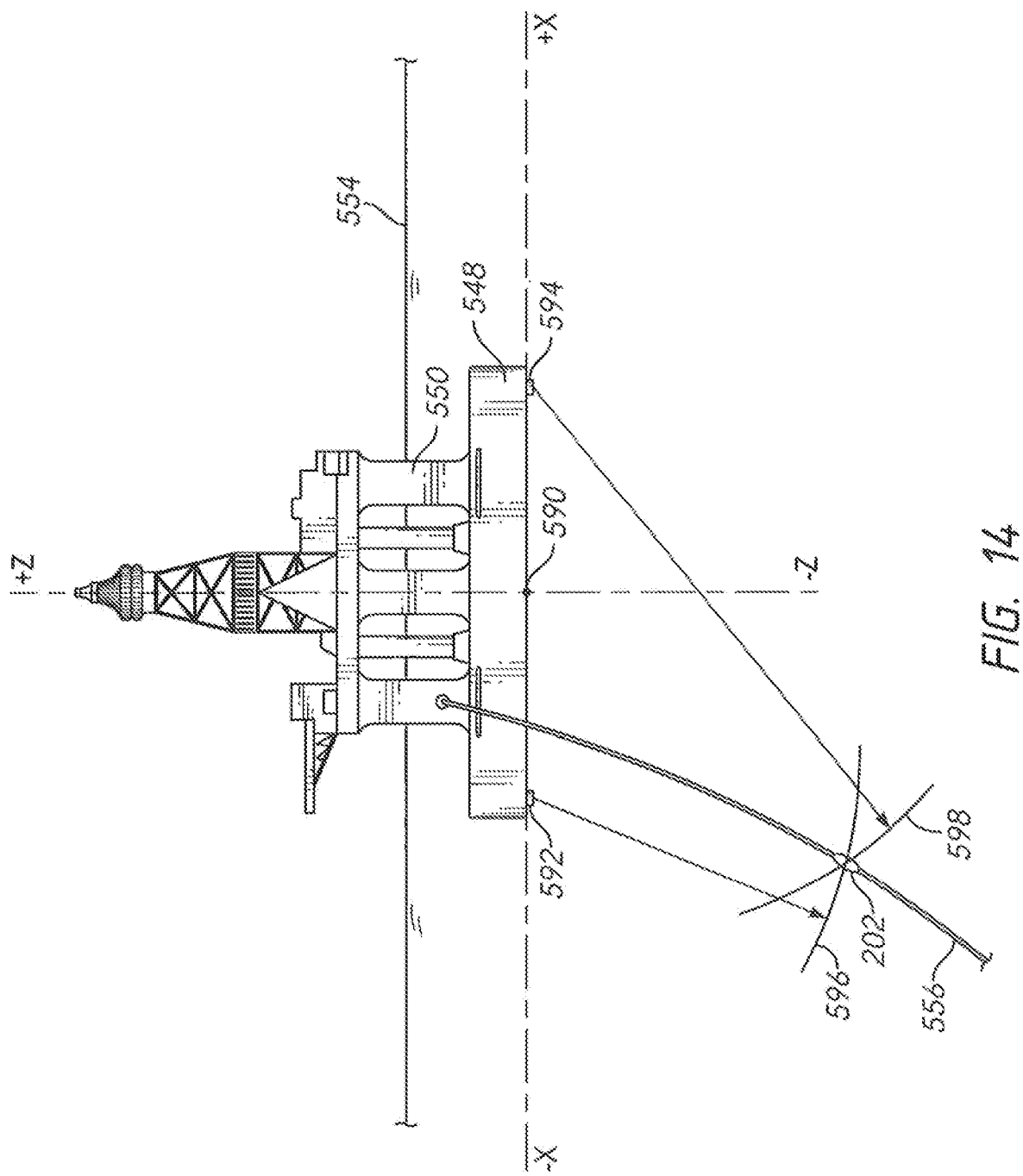
FIG. 14 is an elevation view, showing the use of sound to determine a location for a particular intelligent cable module in two-dimensional space.
Figure 15:
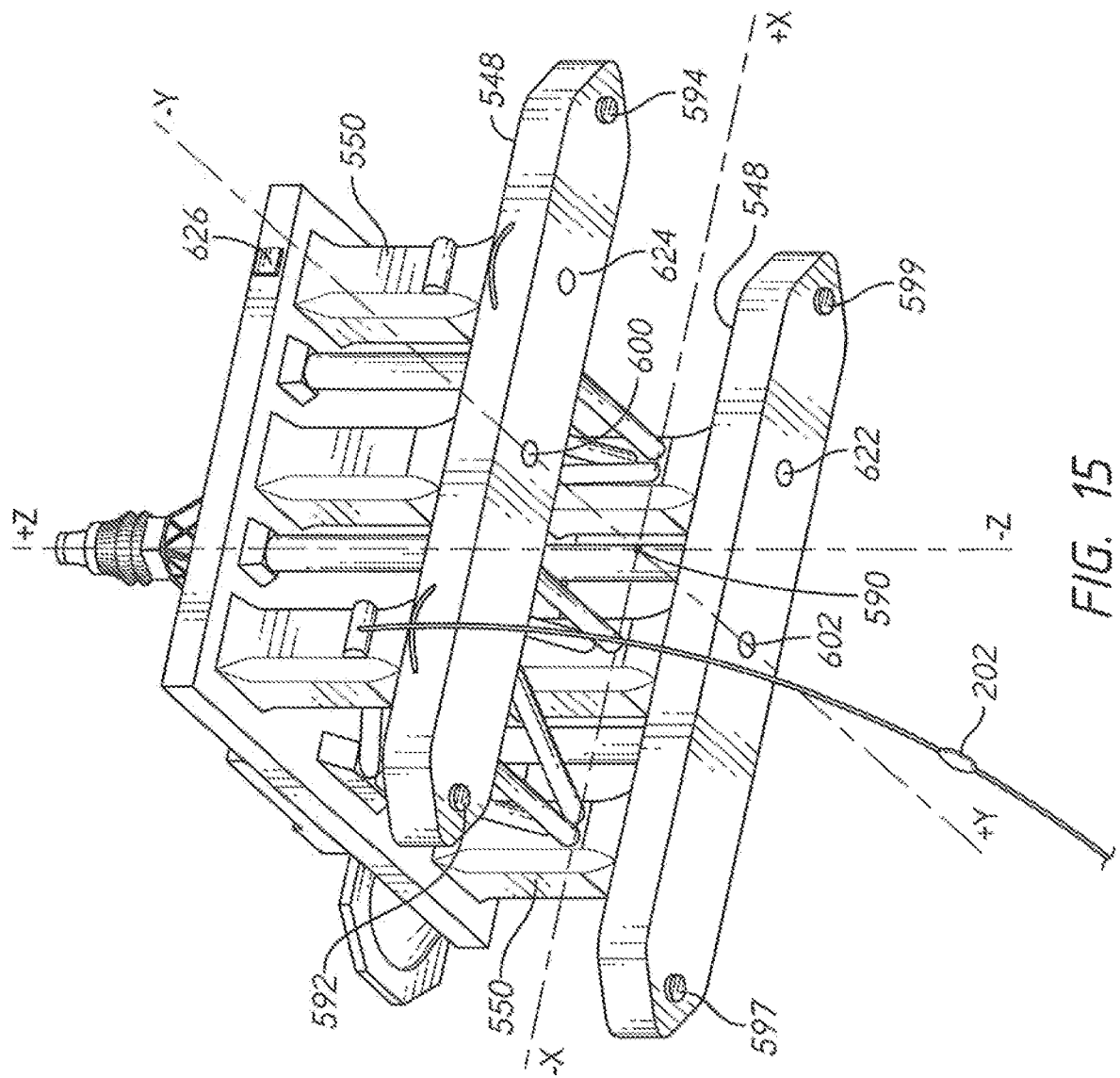
FIG. 15 is a perspective view, showing the use of sound to determine a location for a particular intelligent cable module in three-dimensional space.

As mentioned previously, it is often useful to know the position of each intelligent cable module so that the data it reports can be located in space. FIGS. 14 and 15 illustrate a good approach for determining a position for each module.

FIG. 14 provides a two-dimensional position methodology that serves to illustrate the principles involved. The use of sound waves for spatial location in water is a reliable technology. In the example of FIG. 14 first emitter 592 is located in a first position on pontoon 548 of an oil production platform. Second emitter 594 is located at a second position.

An intelligent cable module 202 is located along mooring line 556. Emitters 592, 594 emit a sound pulse at fixed intervals. In a two-dimensional depiction, each sound pulse propagates as an expanding circle. First emitter arc 596 is a portion of the circle expanding from first emitter 592—as it reaches the position of module 202. Second emitter arc 598 is a portion of the circle expanding from second emitter 594.

It is possible to synchronize all three devices in the time domain (intelligent cable module 202, first emitter 592, and second emitter 594). With this synchronization, module 202 "knows" precisely when each pulse is emitted and then measures precisely when the pulse is received at the module 202. The processor on board the module can then perform a time-in-flight calculation to determine a distance to each emitter based on the speed of sound in water.

A simple example will illustrate this operation: A coordinate system is arbitrarily established. Origin 590 lies in the plane of the keel of the pontoons. The +X axis extends to the right in the view. The +Y axis extends into the page. The +Z axis extends upward as shown. Emitters 592, 594 lie along the X axis. The position of each emitter is known. The distance between emitter 592 and emitter 594 is 80 meters (One is located at the +40 m position along the X axis and one is located at the −40 m position).

Module 202 detects the sound signal from first emitter 592 0.650 seconds after it was transmitted. The speed of sound in water is nominally 1,500 meters per second. Thus, the distance from module 202 to first emitter 592 is 0.650 s*1500 m/s or 975 m (Note that FIG. 14 is meant to be conceptual in nature and is not drawn to scale). Module 202 detects the sound signal from second emitter 594 0.668 seconds after it was transmitted. Thus, the distance from module 202 is 0.668 s*1500 m/s or 1002 m.

Figure 23:
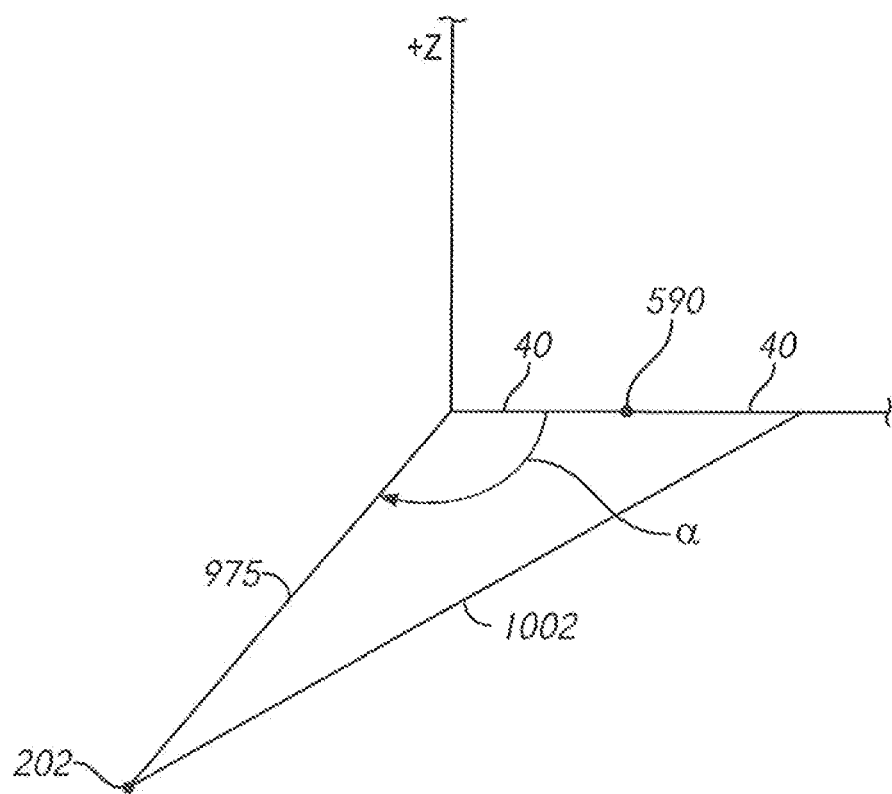
FIG. 23 is a graphical view conceptually illustrating the use of time-in-flight calculations to derive a location in space.

FIG. 23 illustrates the use of these time-in-flight calculations to derive a position for module 202. In this example first emitter 592 is located at the −40 m position on the X-axis and second emitter 594 is located at the +40 m position. From the values shown, the law of cosines can be used to determine a value for the angle α:

$$\alpha = \cos^{-1}\left[\frac{80^2 + 975^2 + 1002^2}{(2)(80)(975)}\right] = 107.53 \text{ degrees}$$

Thus, relative to the origin 596 the position of module 202 (in 2D space in the place defined by X-Z) is:

$x = -40 + 975 * \cos \alpha = -333.7$ m $y = -975 * \sin \alpha = -929.7$ m

The position of the module 202 can thereby be determined. In studying the equations one will appreciate that they actually produce two solutions in two different positions. This is common for time-in-flight calculations. One of the two solutions is above the surface of the water and that one can be rejected.

Those skilled in the art will realize that maintaining good synchronization between the emitters and the intelligent cable modules can be challenging over time. It is possible to provide a spatial location system that does not depend on time synchronization. Such a system measures only the time of arrival of signals from multiple emitters without knowing the precise time when the sound wave left each emitter. The emitters in such a system emit their pulses at the exact same time, but the receiving module does not "know" that time. The intelligent cable module can only determine differences in arrival times. In 2D space, solving for a location using only differences in arrival time requires the addition of a third emitter whose location is known. Thus, a third emitter will need to be added to the platform or other stable structure in order to determine a location in space when the intelligent cable module is not time-synchronized to the emitters. A third emitter can be added to the location origin 590 as an example.

Those skilled in the art will also know that the speed of sound in water varies significantly with temperature and with salinity. Thus, it is advantageous to provide temperature and salinity sensors for the modules (or at least some of them). Further, those skilled in the art will realize that the water temperature will vary significantly from the surface to the sea floor. It is possible to use the water temperature at various depths (as collected by multiple modules along a mooring cable) to develop a complex model for the variation in the speed of sound as a sound wave leaves the emitter and travels to a particular module. Accounting for these variations in the speed of sound will increase positional accuracy—though they are not essential to carrying out the invention.

The determination of a spatial position for each module becomes more complex in 3D space. FIG. 15 shows a view of the same oil production platform from beneath the water—looking up. In this view the reader can easily see all three coordinate axes (X, Y, Z) centered on origin 590. The problem of determining a location of each module varies according to whether the intelligent cable modules can be operated in time synchronization with the emitters. Time synchronization allows a direct time-in-flight distance calculation to be made by the receiving module (since it "knows" what time each pulse left the emitter). Three emitters are sufficient to resolve the location of each module when operated with time synchronization. Thus, in addition to first emitter 592 and second emitter 594, third emitter 597 is needed. It is advantageous to maximize the spatial separation between the emitters. Thus, third emitter 597 is located on the opposite pontoon. As for the 2D example, two solutions exists for the 3D equations. One of these solutions again lies above the surface of the water and can be disregarded.

It is also possible to determine a spatial location for each intelligent cable module using only the differences in the time of arrival of the various signals (without time synchronization). As explained previously, in a non-synchronized mode of operation, all emitters emit a pulse simultaneously, but each module does not "know" when the pulse was emitted. Four separate emitters are needed to resolve a spatial location in 3D using only the differences in arrival time. Thus, for a 3D system without time synchronization, fourth emitter 599 is provided as well.

In order to provide non-interfering transmission and reception, it is preferable to assign a unique frequency to each emitter. Each emitter will transmit a frequency on this frequency. In some embodiments each emitter will transmit continuously with an embedded time signal in the transmission.

In order to provide system robustness it is preferable to provide additional emitters—such as fifth emitter 600 and sixth emitter 602. These additional emitters can enhance accuracy by providing multiple solutions for the spatial location of each module. They can also provide redundancy in the case of signal blockage or interference.

Data collected by the various intelligent cable modules 202 is also preferably transmitted back to a data collection and analysis system. Data collectors 622 and 624 are provided on the oil platform for receiving sound-based transmissions back from the modules. These transducers feed the received data to data collection and analysis system 626—which may be located on the platform or elsewhere.

The reader will thereby appreciate that the inventive system can determine an accurate location for each intelligent cable module in a set of multiple cable modules—even where the modules are attached to multiple different tensile strength members. In order to further the goal of structural health monitoring, it will at some times be desirable to know an orientation for each module as well.

The problem of orientation is difficult to solve without some type of inertial measurement unit ("IMU") on board each module. Traditional IMU's involved gyroscopes, but these have been replaced by solid state ring laser assemblies and other devices that can provide accurate roll, pitch, and yaw data. Such systems are expensive, however. Such systems also need to be periodically recalibrated. While it is possible to provide such a system in each node, the operation of an IMU may not be practical in an undersea environment or other environment where access to the intelligent cable modules is difficult. Fortunately, it is possible to provide useful orientation information without the need for an IMU.

Figure 24:
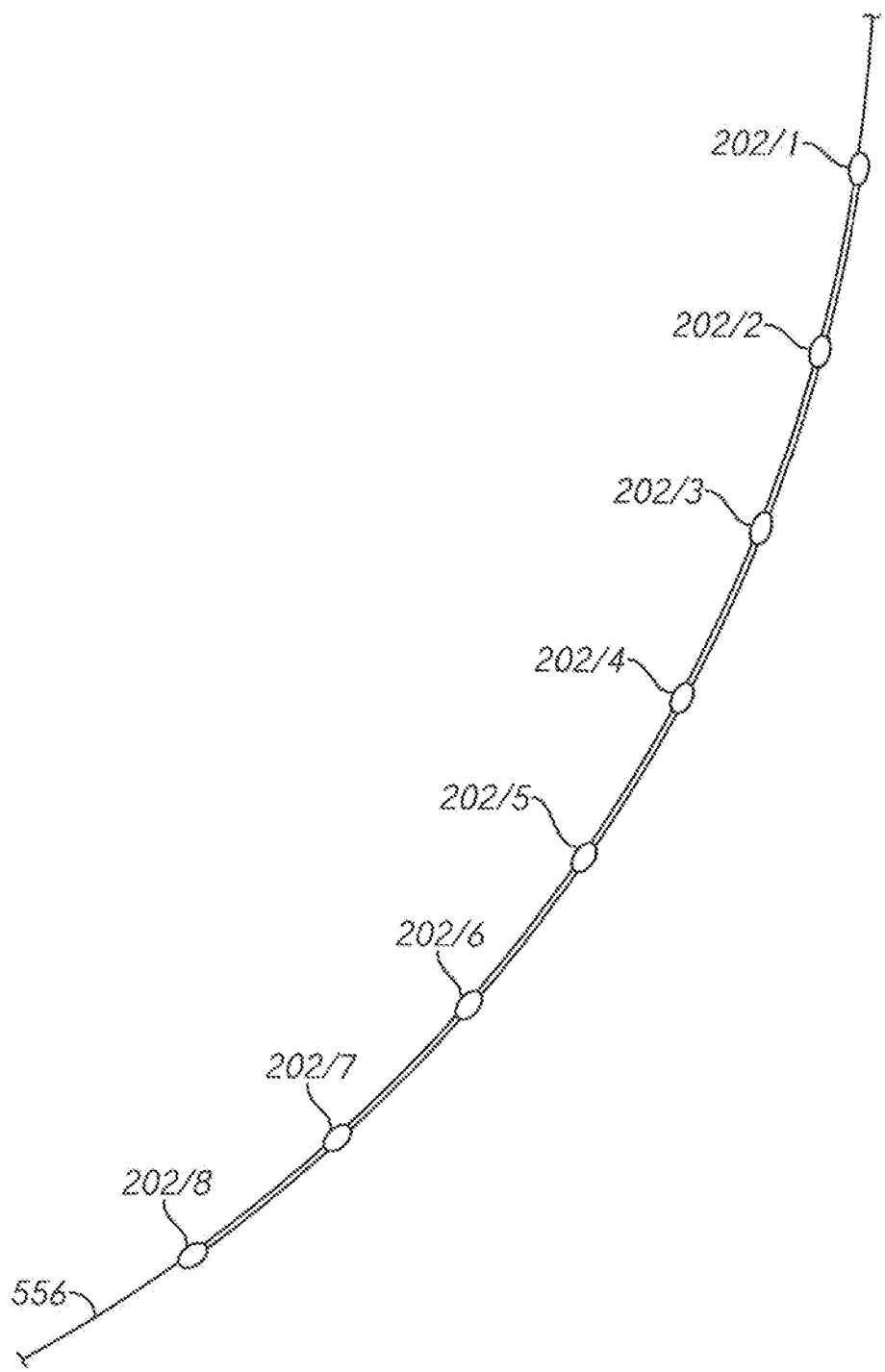
FIG. 24 is an elevation view, showing an approximation of the curvature of a mooring line.

FIG. 24 depicts a mooring line 556 attached to an offshore oil production platform as described previously. Multiple intelligent cable modules 202 are installed along this line (202/1, 202/2, 202/3 . . . ). The position of each of these modules 202 is determined as described previously. The orientation of each module is not determined using the position-determining system. However, the reader will note that the mooring line 556 is a smoothly-curved object. This will be true for most applications of the modules 202—since SHM will be performed with the tensile strength member under load and placing a tensile strength member under load tends to produce a smoothly-curved object.

Figure 25:
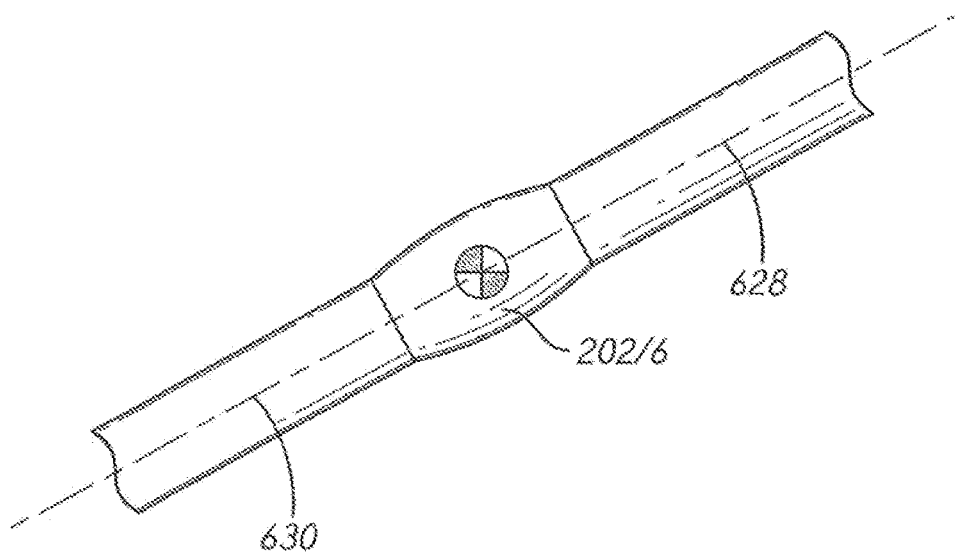
FIG. 25 is a perspective view, showing an approximation of the curvature of a mooring line.

Since the position of each module 202 in FIG. 24 is known, it is possible to fit a 3D curve through the position of each module. In fact, a good curve approximation results from just connecting a straight line segment between each module. FIG. 25 shows a particular intelligent cable module 202/6. Superior segment 628 is a straight line projected between the location of module 202/6 and the location of module 202/5. Inferior segment 630 is a straight line projected between the location of module 202/6 and the location of module 202/7.

Figure 26:
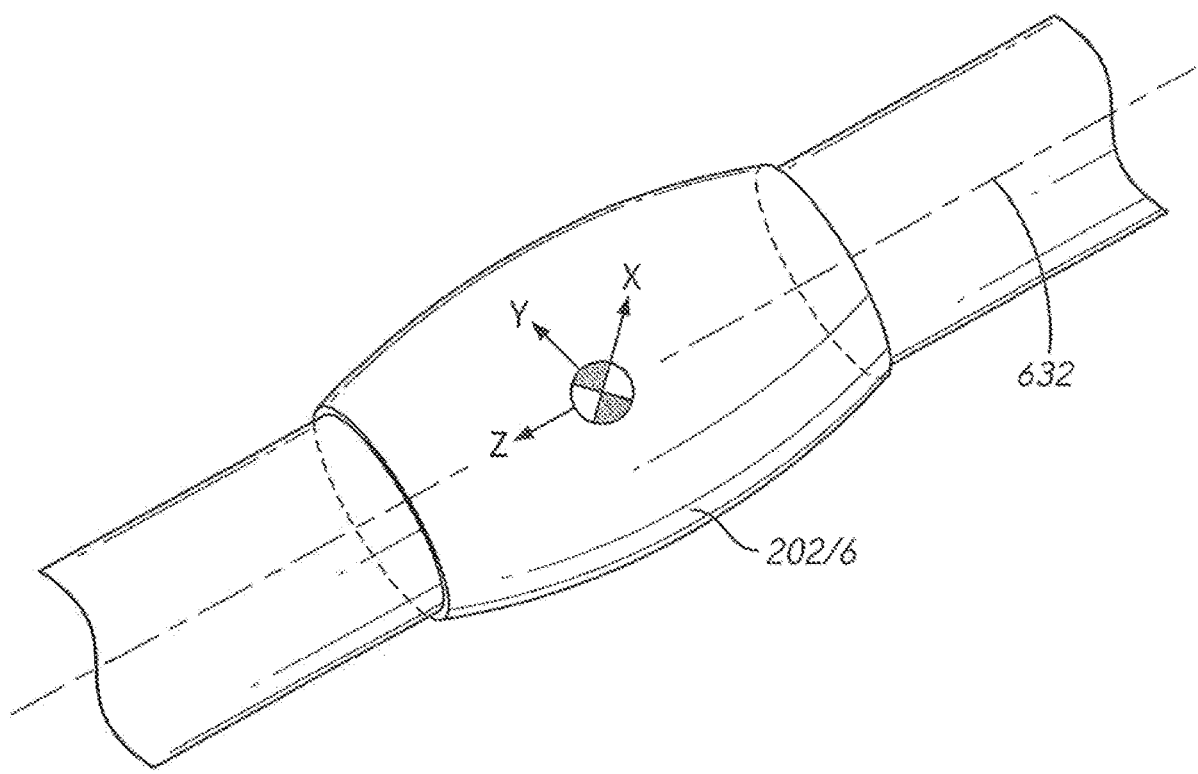
FIG. 26 is a perspective view, showing a coordinate system for an intelligent cable module.

FIG. 26 depicts an enlargement of module 202/6, with a local 3D origin and coordinate system (X, Y, Z) centered on the module. Inferred local segment 632 is simply the average of the slopes of superior segment 628 and inferior segment 630—placed on the origin of the coordinate system shown. The reader will recall that the module 202 preferably includes an accelerometer module. This module can include three orthogonal accelerometers aligned with the axes shown.

Roll of the module about the Z axis will be difficult to determine. However, an interesting consideration for SHM is simply lateral acceleration. If one measures acceleration along the X axis and the Z axis, one can then compute the maximum lateral acceleration and derive the maximum lateral motion. This is useful without knowing the roll state of the module.

The preceding sections described the methods used in the invention to determine the location of the intelligent cable modules and—optionally—some orientation information for the cable modules. The following sections describe the use of this information in performing structural health monitoring. Each module 202 preferably includes the ability to monitor the current tension in the cable at the point of the module (recall the exemplary embodiment of FIGS. 9 and 10). The data acquisition and analysis system preferably provides a current location in space for each module. This allows a determination of the distance between each module to be made.

Thus, the system allows for real-time monitoring of applied tension and resulting elongation of the cable. This information then allows a determination for the present value of the cable's modulus of elasticity in tension. A change in the value for the modulus of elasticity indicates a change in the structural health of the tensile strength member.

Of course, accurate monitoring of the elongation of the cable is not a simple matter. Looking against at FIG. 24, the reader will recall that a mooring line 556 used in an application like an offshore oil production platform has a substantial curvature. When tension increases two adjacent modules will move away from each other. However, this is due to two phenomena: (1) the straightening of the curved cable, and (2) the elongation of the cable itself. It is important to quantify the straightening of the cable because this does not actually represent strain. Thus, the use of the accelerometer module to quantify lateral motion is helpful.

Figure 16:
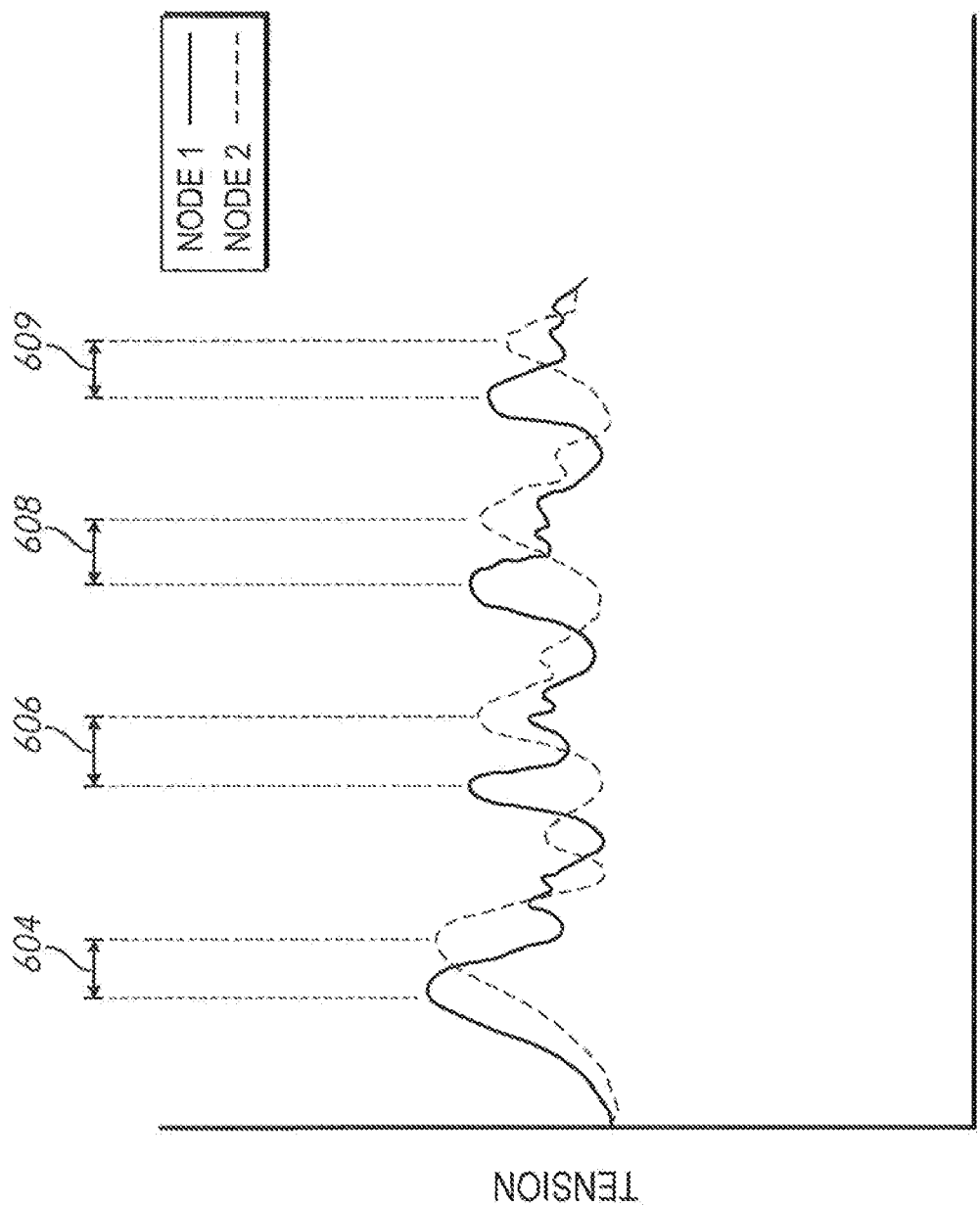
FIG. 16 is a plot showing mooring line tension versus time (for two module locations along a mooring line).

Other values that are useful to SHM can be more straightforward to determine. FIG. 16 depicts a plot of tension sensed by two separate intelligent cable modules (depicted as "node 1" and "node 2"). The solid line depicts the tension measured at node 1. The dashed line represents tension measured at node 2 at the same instant in time. The reader will observe the delay in the propagation of tension waves down the cable on which these modules are installed. Propagation waves delays 604, 606, 608, 609 can be determined for the peak of tension waves traveling longitudinally along the mooring lines. These can be used to establish a baseline expected propagation delay for a given range of amplitudes. A change in this propagation delay indicates a change in the health of the cable. Thus, monitoring this parameter is important for SHM.

Figure 17:
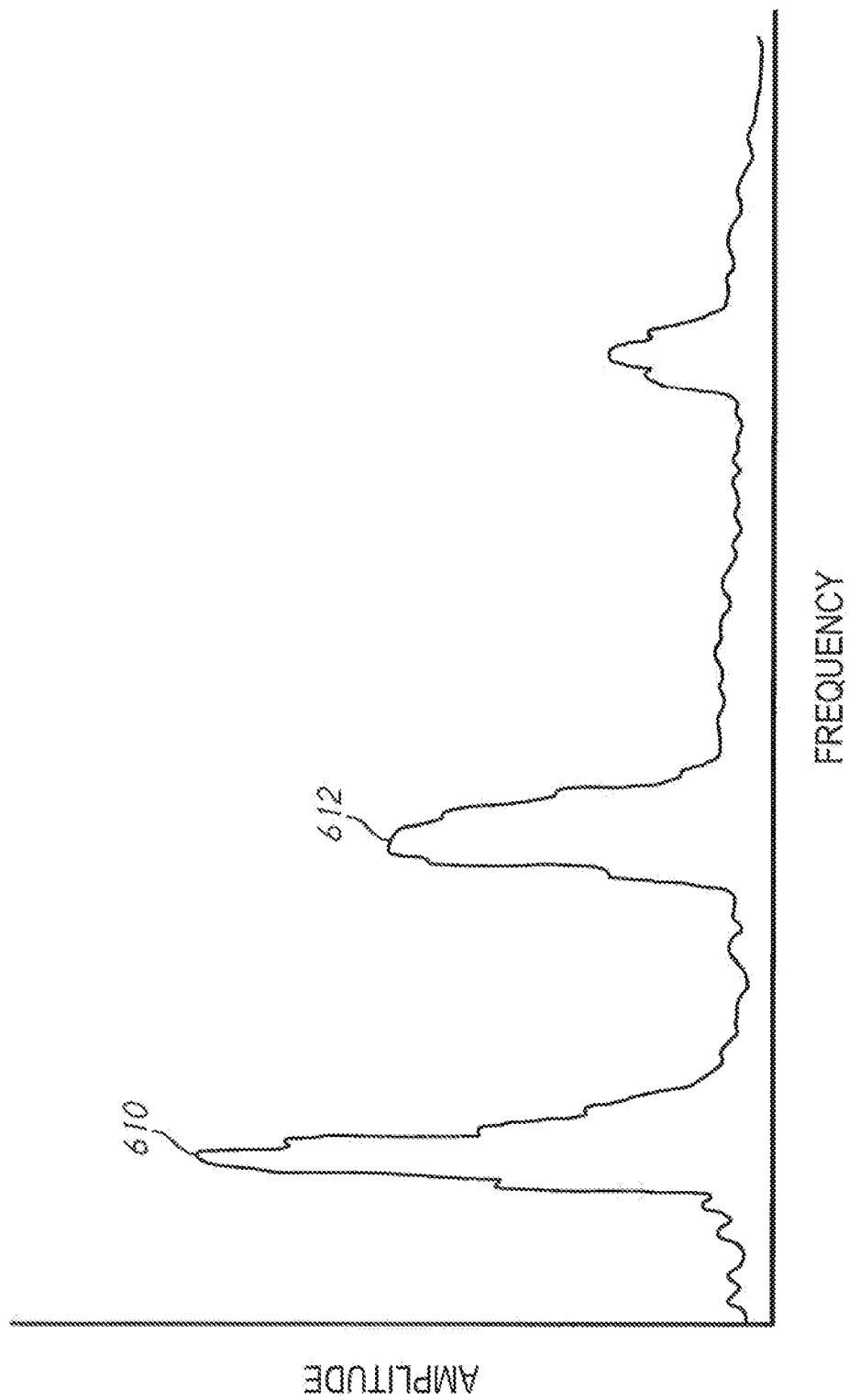
FIG. 17 is a frequency-domain plot showing amplitude versus frequency for mooring line tension.

FIG. 17 provides a plot of tension for a particular node in the frequency domain—such as the result of applying a Fast Fourier Transform to tension data collected over time. The reader will note the presence of a first resonance mode 610 centered on a first frequency and a second resonance mode 612 centered on a second frequency. The stability of these frequency peaks is indicative of structural health. A shift in frequency is therefore useful for SHM.

Figure 18:
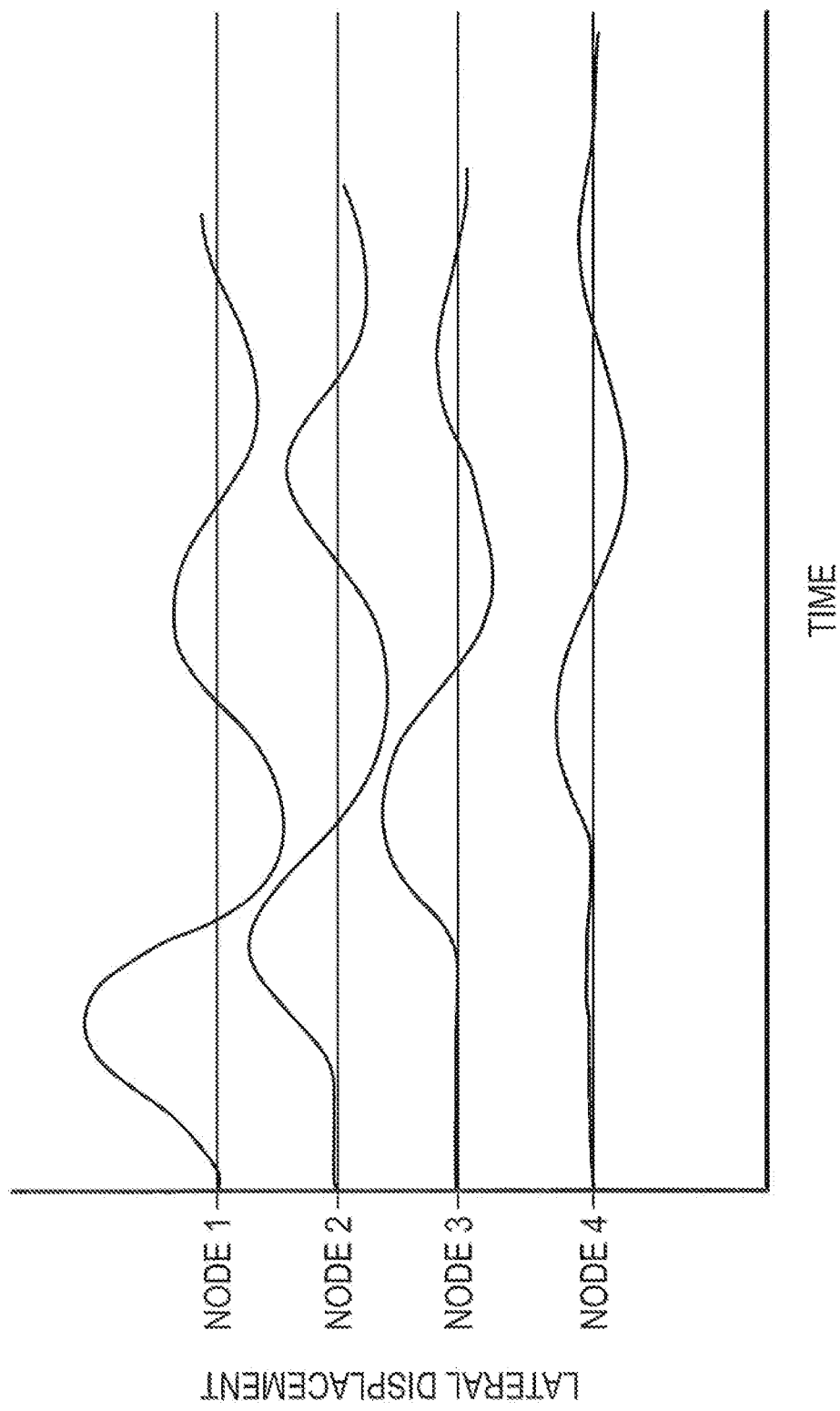
FIG. 18 is a plot showing lateral displacement versus time for a mooring line.

FIG. 18 shows a plot for four separate intelligent cable modules located along the length of a mooring line (node 1, node 2, node 3, node 4). The plot shows lateral displacement derived from the accelerometer module—with the orientation of the module being approximately determined as shown in FIGS. 24-26 so that the lateral components of motion can be isolated. The reader will note the propagation delay of lateral motion waves traveling along the cable. The amount of delay can be used for SHM. The frequency distribution of lateral waves can also be used for SHM.

Figure 4:
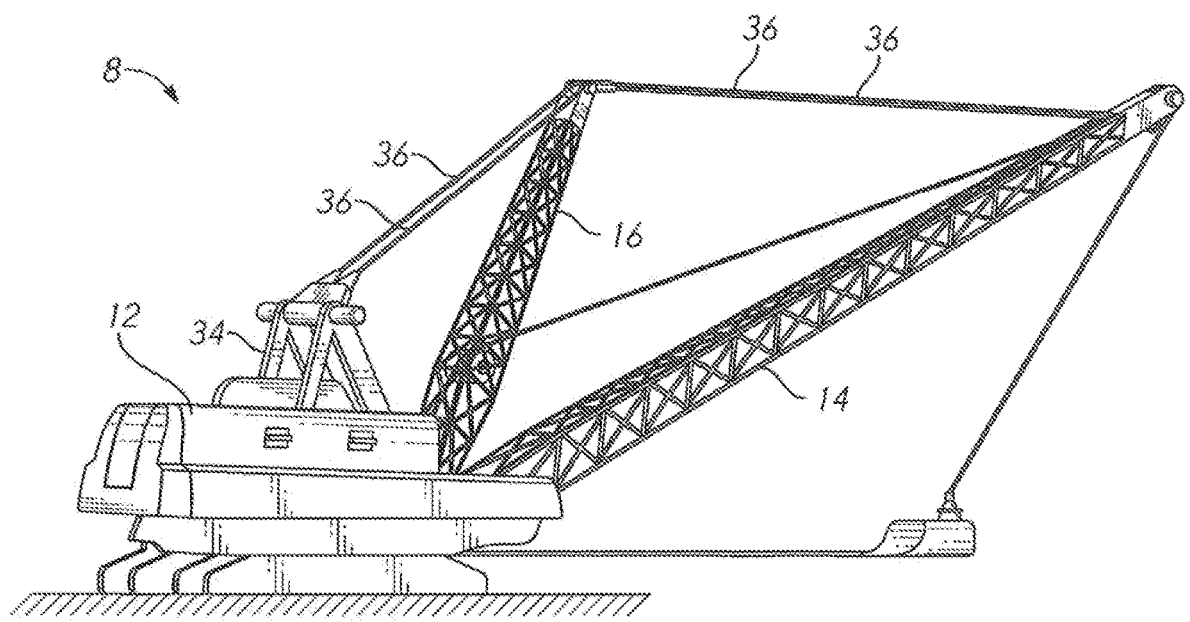
FIG. 4 is a perspective view, showing a prior art drag line crane.
Figure 5:
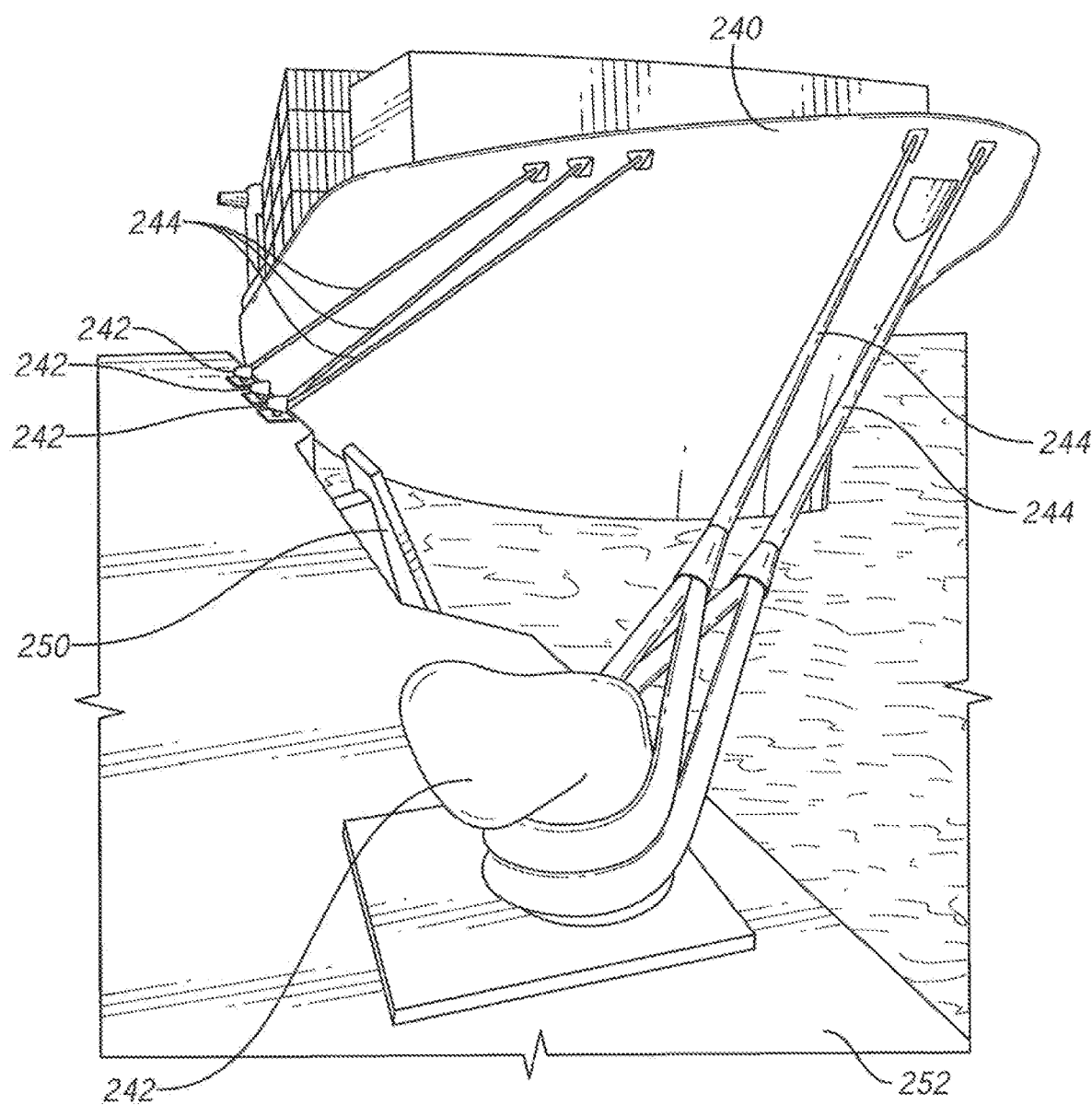
FIG. 5 is a perspective view, showing a prior art vessel mooring system.
Figure 6:
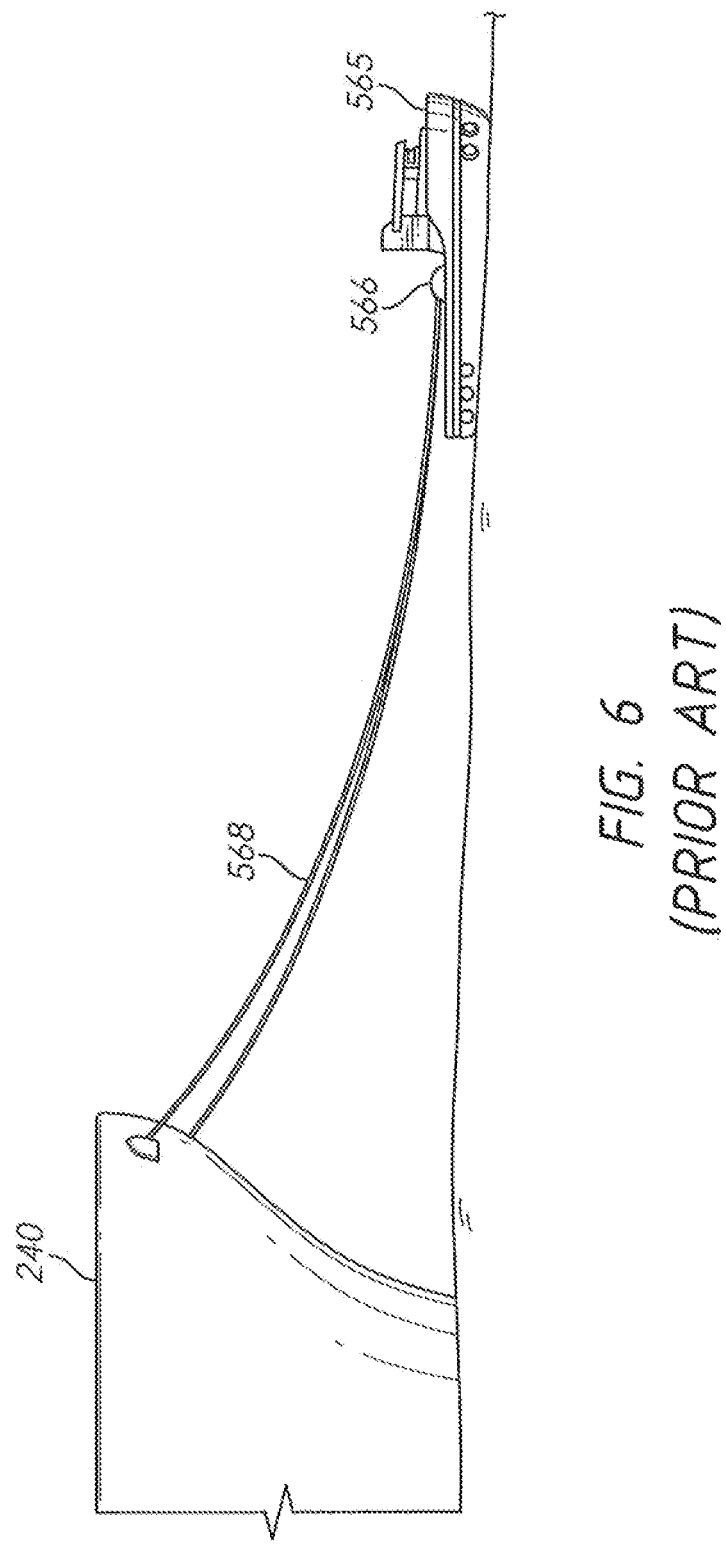
FIG. 6 is an elevation view, showing a vessel towing system.
Figure 19:
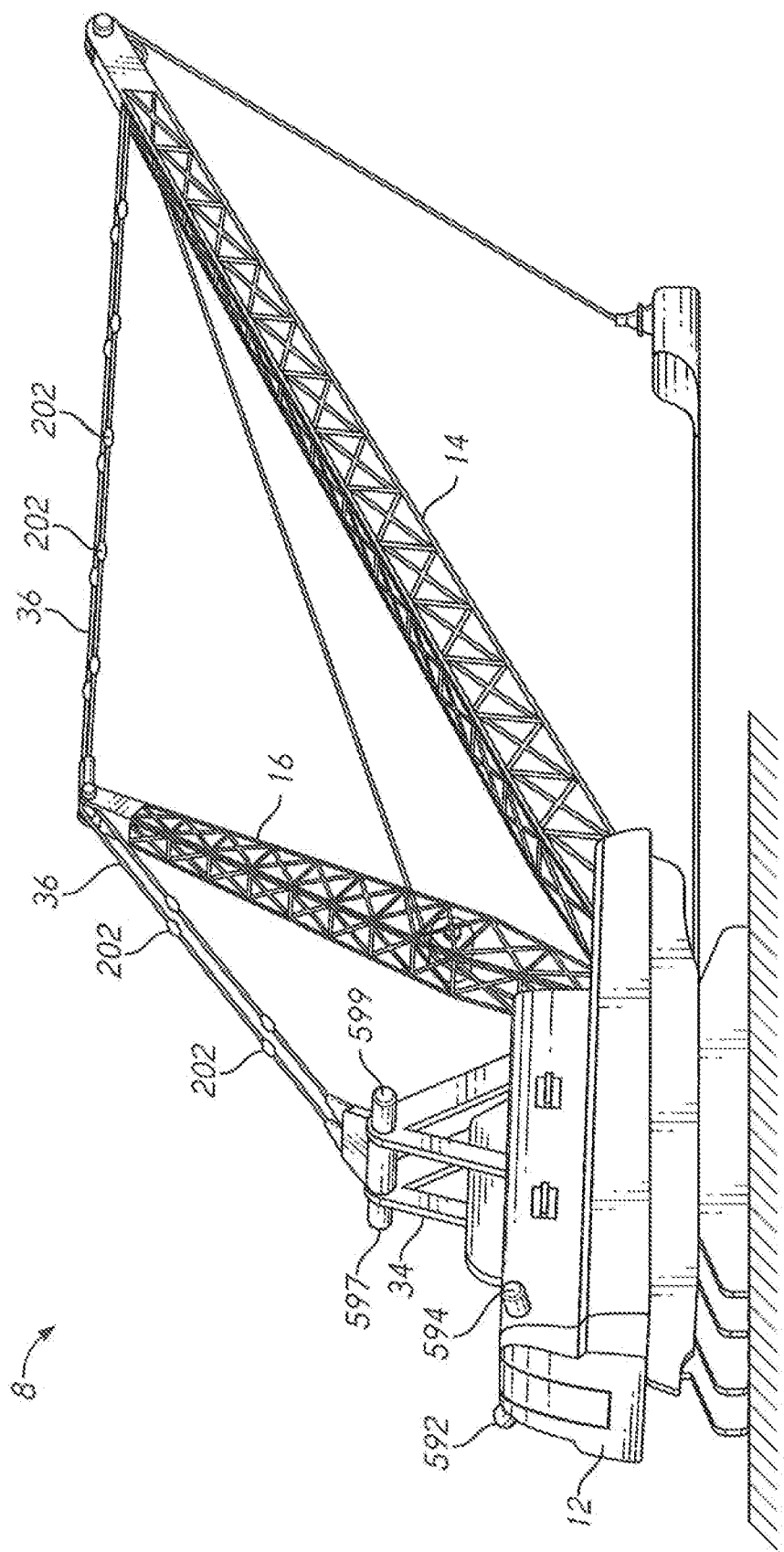
FIG. 19 is a perspective view, showing the application of the present invention to a drag line crane.

The preceding examples have focused on undersea mooring lines used to moor an offshore oil production platform. The inventive system and method is applicable to many other fields as well. FIG. 19 shows the drag line crane of FIG. 4 with a set of intelligent cable modules 202 added to the bridge support ropes 36. The present location of these modules is determined using ultrasonic emission and detection. First detector 592 and second detector 594 are added to the rear, upper corners of the cab. Two additional emitters 597,599 are located on A-frame 34. Sound transducers onboard each module 202 receive these sound waves. The time-in-flight information (or time difference information for asynchronous operation) is used to determine a position of each of the modules 202. Orientation can likewise be determined as explained previously.

Figure 20:
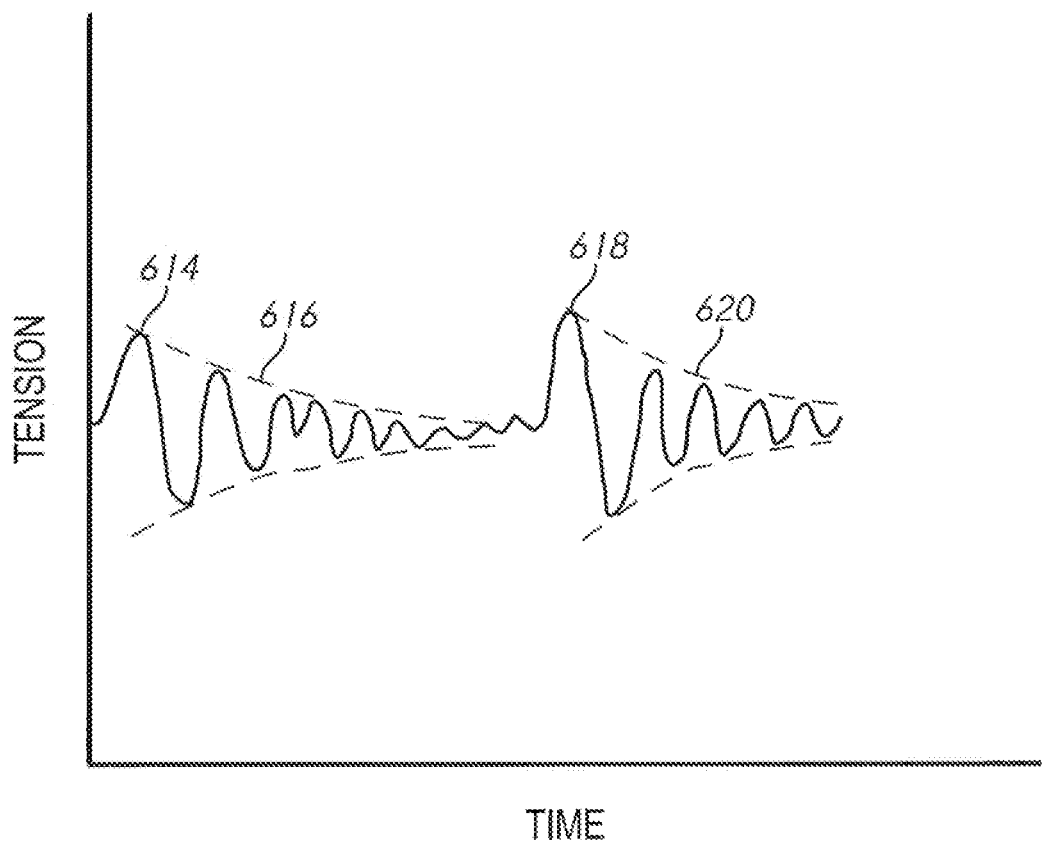
FIG. 20 is a plot of tension versus time for an intelligent cable module installed on a drag lien crane.
Figure 21:
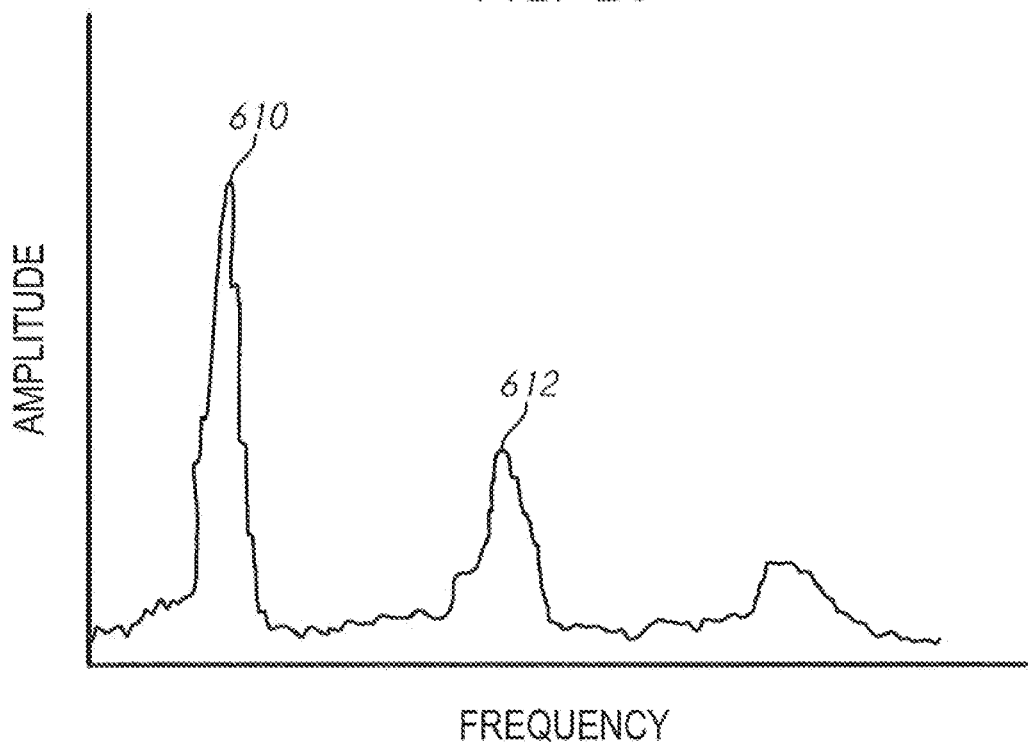
FIG. 21 is a frequency-domain plot for an intelligent cable module installed on a drag lien crane.

FIGS. 20 and 21 show information obtained from the modules 202 on the drag line crane of FIG. 19. FIG. 20 shows tension measured at a particular module. Shock load 614 is seen as a peak amplitude—resulting from a shock imparted by the drag line bucket to the boom. Damping profile 616 follows shock load 614. A second shock load 618 and damping profile 620 is also seen. The damping profile characteristics are useful in SHM. An alteration in the damping profile is indicative of a change in the structural health of the cable.

FIG. 21 shows a plot of tension resonance for the drag line crane cables taken into the frequency domain. An alteration in the center frequencies 610, 612 can again be useful in monitoring structural health.

Figure 22:
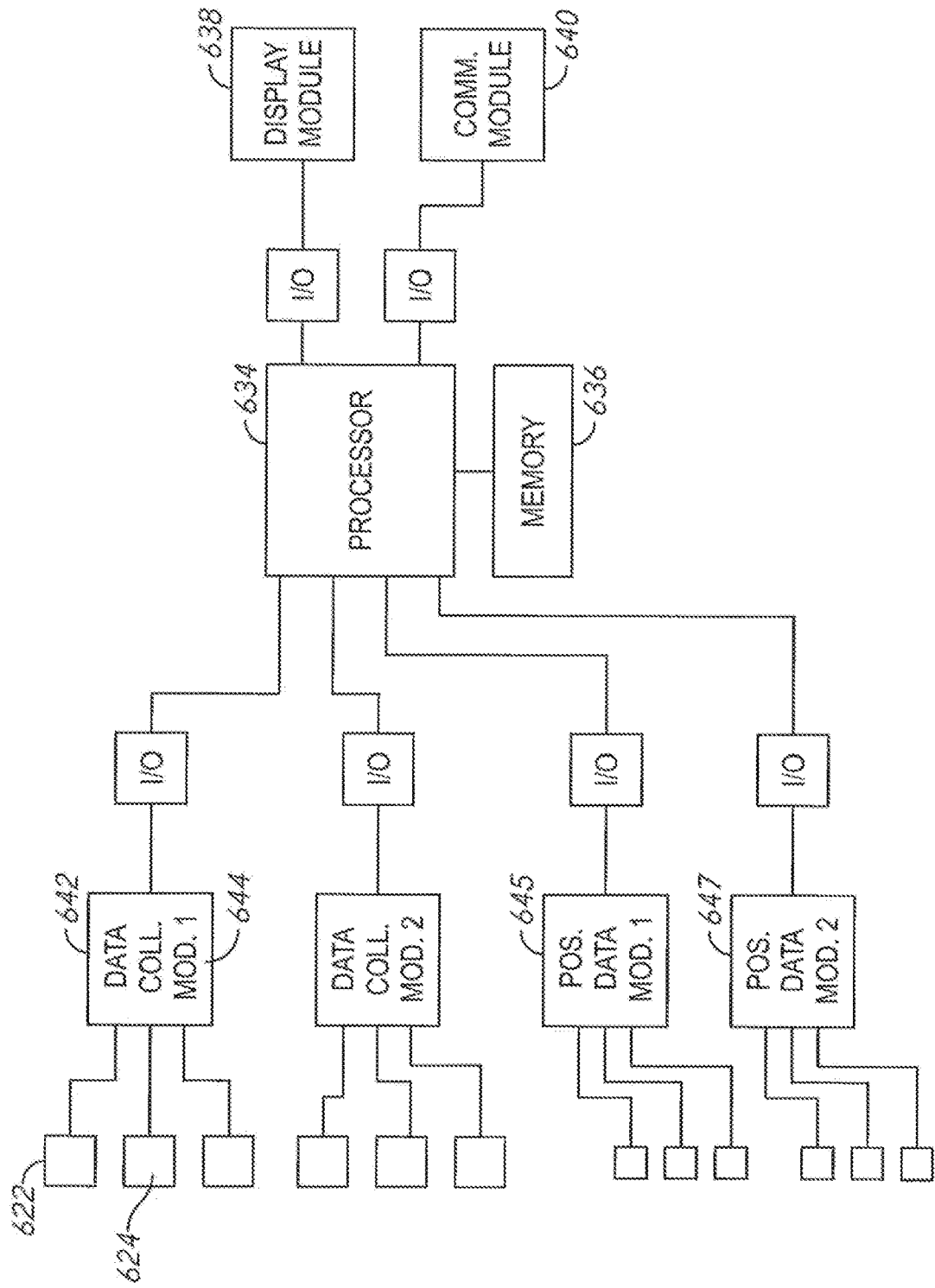
FIG. 22 is a block diagram showing an exemplary embodiment of a data collection and analysis system.

The present invention utilizes a data collection and analysis system. This can be a centralized system or—as is increasingly common—it can be a decentralized system in which processing is done on multiple processors at multiple locations. FIG. 22 depicts a simplified embodiment in which a central processor collects and analyzes the information obtained from the multiple intelligent cable modules.

Processor 634 retrieves software from memory 636 and executes this software to carry out the data analysis. Display module 638 provides information for depicting results to a user. Communication module 640 exchanges information with other processors or computing systems. Data collection module 642 exchanges information with multiple data transducers 622, 624. Data collection module 644 does likewise.

Processor 634 also communicates with position data modules 644. The position data modules control the emitters 592, 594, etc. In this example, the position data modules also receive information back from intelligent cable modules 202 as to when the emitter signals were received. Processor 634 then performs the calculations necessary to determine the position of each individual intelligent cable module 202 (and optionally the orientation of each module 202 as well).

The inventive system and method can include many other features, which can be combined in a variety of ways. These include:

(1) The modules 202 can transmit time difference information only back to the data collection and analysis system (for a system where the modules are not all synchronized in the time domain). The modules 202 will also reference any measurement it makes (tension, lateral acceleration, etc.) to a reference time—such as the time of receipt of a signal from the first emitter. Processor 634 uses this information to externally compute a position for each module 202. Processor 634 uses its own internal reference time. Processor 634 then correlates all the measurement data from each module 202 to the reference time—so that all the data collected can be properly placed on a unified timeline.

(2) The modules 202 can internally calculate their own position, and then transmit this position to the external data collection and analysis system.

(3) The position of each module and the associated data can be determined and correlated at periodic monitoring intervals (such as 10 minutes every day).

(4) The position of each module and the associated data can be monitored at periodic intervals or in times of suspected higher stress (such as rough seas surrounding an offshore platform).

(5) The data collection and analysis system in many embodiments will not solve for actual engineering values in the cable—such as tension. Instead, the system will simply establish a set of baseline measured parameters and then monitor for a change in these parameters. SHM can be accomplished by measuring a change in the baseline state and by measuring a rate of change in the baseline state.

Although the preceding description contains significant detail, it should not be construed as limiting the scope of the invention but rather as providing illustrations of the preferred embodiments of the invention. As an example, any of the embodiments described for use on a full cable can be adapted for use on a single strand of a larger cable, and vice-versa. Those skilled in the art will be able to devise many other embodiments that carry out the present invention. Thus, the language used in the claims shall define the invention rather than the specific embodiments provided.

Having described our invention, we claim:

1. A method of monitoring structural health of a tensile strength member, comprising:
   providing a plurality of intelligent modules, each respective intelligent module coupled to the tensile strength member at a distance from one another along a length of the tensile strength member;
   providing a data collection and analysis system;
   providing an intelligent module location system, configured to determine location information for each of the intelligent modules at a corresponding time value, and send the location information and the corresponding time value to the data collection and analysis system;
   each of the modules configured to measure a vibration at a corresponding time value, and send vibration information corresponding to the vibration and the corresponding time value to the data collection and analysis system;

the data collection and analysis system using the vibration information, the location information, and the corresponding time values for the intelligent modules to determine a baseline state for a first parameter characterizing the structural health of the tensile strength member;

the data collection and analysis system continuing to collect the vibration information, the location information, and the corresponding time values to determine a current state for the first parameter; and the data collection and analysis system determining a current state of health for the tensile strength member by determining a difference between the current state for the first parameter and the baseline state for the first parameter.

2. The method of claim 1, wherein the first parameter is a modulus of elasticity for the tensile strength member.

3. The method of claim 1, wherein the first parameter is a resonant frequency for the tensile strength member.

4. The method of claim 1, wherein the tensile strength member is a mooring line.

5. A system of monitoring structural health of a tensile strength member, the system comprising:

a plurality of intelligent modules, each respective intelligent module coupled to the tensile strength member at a distance from one another along a length of the tensile strength member;

a data collection and analysis system; and an intelligent module location system, configured to determine location information for each of the intelligent modules at a corresponding time value, and send the location information and the corresponding time value to the data collection and analysis system, wherein:

each of the modules are configured to measure a vibration at a corresponding time value, and send vibration information corresponding to the vibration and the corresponding time value to the data collection and analysis system, the data collection and analysis system uses the vibration information, the location information, and the corresponding time values for the intelligent modules to determine a baseline state for a first parameter characterizing the structural health of the tensile strength member, the data collection and analysis system continuing to collect the vibration information, the location information, and the corresponding time values to determine a current state for the first parameter, and the data collection and analysis system determining a current state of health for the tensile strength member by determining a difference between the current state for the first parameter and the baseline state for the first parameter.

6. The system of claim 5, wherein the first parameter is a modulus of elasticity for the tensile strength member.

7. The system of claim 5, wherein the first parameter is a resonant frequency for the tensile strength member.

8. The system of claim 5, wherein the tensile strength member is a mooring line.

\* \* \* \* \*